(12) United States Patent
Kimura

(10) Patent No.: US 12,200,260 B2
(45) Date of Patent: Jan. 14, 2025

(54) IMAGE PROCESSING APPARATUS AND METHOD

(71) Applicant: SONY SEMICONDUCTOR SOLUTIONS CORPORATION, Kanagawa (JP)

(72) Inventor: Tsuyoshi Kimura, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 238 days.

(21) Appl. No.: 17/617,492

(22) PCT Filed: Jun. 8, 2020

(86) PCT No.: PCT/JP2020/022487
§ 371 (c)(1),
(2) Date: Dec. 8, 2021

(87) PCT Pub. No.: WO2020/255771
PCT Pub. Date: Dec. 24, 2020

(65) Prior Publication Data
US 2022/0256194 A1     Aug. 11, 2022

(30) Foreign Application Priority Data
Jun. 20, 2019    (JP) ................. 2019-114623

(51) Int. Cl.
*H01L 29/94* (2006.01)
*H04N 19/177* (2014.01)
*H04N 19/70* (2014.01)

(52) U.S. Cl.
CPC ........... *H04N 19/70* (2014.11); *H04N 19/177* (2014.11)

(58) Field of Classification Search
CPC .... H04N 19/70; H04N 19/177; H04N 19/436; H04N 19/184; H04N 19/187; H04N 19/44; H04N 19/82; H04N 19/86
See application file for complete search history.

(56) References Cited

U.S. PATENT DOCUMENTS

| | | | |
|---|---|---|---|
| 2010/0021143 A1 | 1/2010 | Toma et al. | |
| 2010/0202759 A1* | 8/2010 | Sasaki | H04N 19/597 386/212 |

(Continued)

FOREIGN PATENT DOCUMENTS

| | | |
|---|---|---|
| CN | 101548548 A | 9/2009 |
| CN | 101695114 A | 4/2010 |

(Continued)

OTHER PUBLICATIONS

International Search Report and Written Opinion of PCT Application No. PCT/JP2020/022487, issued on Aug. 11, 2020, 09 pages of ISRWO.

(Continued)

*Primary Examiner* — Joseph Suh
(74) *Attorney, Agent, or Firm* — CHIP LAW GROUP

(57) ABSTRACT

Provided is an image processing apparatus and method for shortening a delay from inputting of a stream till generation of a decoded image. The image processing apparatus generates an encoded stream by adding at least part of header information about a second access unit (AU) to be processed immediately after a first AU or information regarding at least part of the header information, to supplemental enhancement information (SEI) about the first AU.

10 Claims, 23 Drawing Sheets

(56) References Cited

U.S. PATENT DOCUMENTS

| | | | | |
|---|---|---|---|---|
| 2010/0272172 | A1* | 10/2010 | Chiba | H04N 19/46 375/E7.027 |
| 2014/0093180 | A1 | 4/2014 | Esenlik | |
| 2015/0181233 | A1* | 6/2015 | Ramasubramonian | H04N 19/70 375/240.16 |
| 2015/0271525 | A1* | 9/2015 | Hendry | H04N 19/107 375/240.27 |

FOREIGN PATENT DOCUMENTS

| | | |
|---|---|---|
| CN | 103959768 A | 7/2014 |
| CN | 104303503 A | 1/2015 |
| CN | 104935944 A | 9/2015 |
| CN | 107409229 A | 11/2017 |
| EP | 2190192 A1 | 5/2010 |
| JP | 2009-027738 A | 2/2009 |
| KR | 10-2010-0033445 A | 3/2010 |
| WO | 2005/120060 A1 | 12/2005 |
| WO | WO-2012124300 A1 | 9/2012 |
| WO | WO-2016111199 A1 | 7/2016 |

OTHER PUBLICATIONS

Sjoberg, et al., "Overview of HEVC High-Level Syntax and Reference Picture Management", Transactions on Circuits and Systems for Video Technology, IEEE, vol. 22, No. 12, Dec. 2012, pp. 1858-1870.

Onishi, et al., "Single-chip 4K 60fps 4:2:2 HEVC Video Encoder LSI with 8K Scalability", Symposium on VLSI Circuits (VLSI Circuits), Jun. 17-19, 2015, 09 pages.

Yoon, et al., "An H.265/HEVC Codec for UHD (3840×2160) Capturing and Playback", International SoC Design Conference (ISOCC), IEEE, Nov. 17-19, 2013, pp. 218-220.

"Infrastructure of audiovisual services—Coding of moving video" Series H: Audiovisual and Multimedia Systems, High efficiency video coding, Telecommunication Standardization Sector of ITU-T, T-REC-H.265-201802, Feb. 13, 2018, 692 pages.

Rajan Joshi et al., "High Efficiency Video Coding (HEVC) Screen Content Coding: Draft 4", Document: JCTVC-U1005, [online], Joint Collaborative Team on Video Coding (JCT-VC) of ITU-T SG 16 WP 3 and ISO/IEC JTC 1/SC 29/WG 11, JCTVC-V0031 (version 1), Oct. 17, 2015, pp. 43-45,94,95,280-282,298-300,364.

Yongjun Wu, et al., "Indication of the end of coded data for pictures and partial-picture regions", Document: JCTVC-S0148, [online], Joint Collaborative Team on Video Coding (JCT-VC) of ITU-T SG 16 WP 3 and ISO/IEC JTC 1/SC 29/WG 11, JCTVC-S0148 (version 1), Oct. 7, 2014, pp. 1-3.

* cited by examiner

FIG. 13

IN CASE OF AVC
- nal_unit_type (IDR OR NOT)
- pic_parameter_set_id
- frame_num
- field_pic_flag
- bottom_field_flag
- INFORMATION NECESSARY IN POC GENERATION
  · pic_order_cnt_lsb, delta_pic_order_cnt_bottom, delta_pic_order_cnt[2]

FIG. 14

IN CASE OF HEVC
- nal_unit_type (IDR OR NOT)
- slice_pic_order_cnt_lsb
- short_term_ref_pic_set_sps_flag
  - st_ref_pic_set(num_short_term_ref_pic_sets)
- short_term_ref_pic_set_idx
- num_long_term_sps
- num_long_term_pics (WHERE LongTerm IS VALID, AND IS ADDED AS Picture)
  - lt_idx_sps[i], poc_lsb_lt[i], used_by_curr_pic_lt_flag[i]
  - delta_poc_msb_present_flag[i], delta_poc_msb_cycle_lt[i]

FIG. 15

| Syntax Parameter | LEVEL | REASON |
|---|---|---|
| nal_unit_type | NECESSARY | NECESSARY TO KNOW WHETHER IT IS IDR |
| pic_parameter_set_id | NECESSARY | TO IDENTIFY PPS AND SPS bottom_field_pic_order_in_frame_present_flag OF PPS IS ALSO NECESSARY |
| frame_num | NECESSARY | frame_num IS NECESSARY IN RefPicList GENERATION |
| field_pic_flag bottom_field_flag | NECESSARY | NECESSARY IN RefPicList GENERATION AT TIME OF Field Coding (NECESSARY ONLY IF PRESENT IN Syntax, UNNECESSARY IF NOT PRESENT IN Syntax.) |
| pic_order_cnt_lsb | NECESSARY | POC IS NECESSARY IN RefPicList GENERATION (PocType=0) |
| delta_pic_order_cnt_bottom | NECESSARY | POC IS NECESSARY IN RefPicList GENERATION (PocType=0) |
| delta_pic_order_cnt[0] AND delta_pic_order_cnt[1] | NECESSARY | POC IS NECESSARY IN RefPicList GENERATION (PocType=1) |

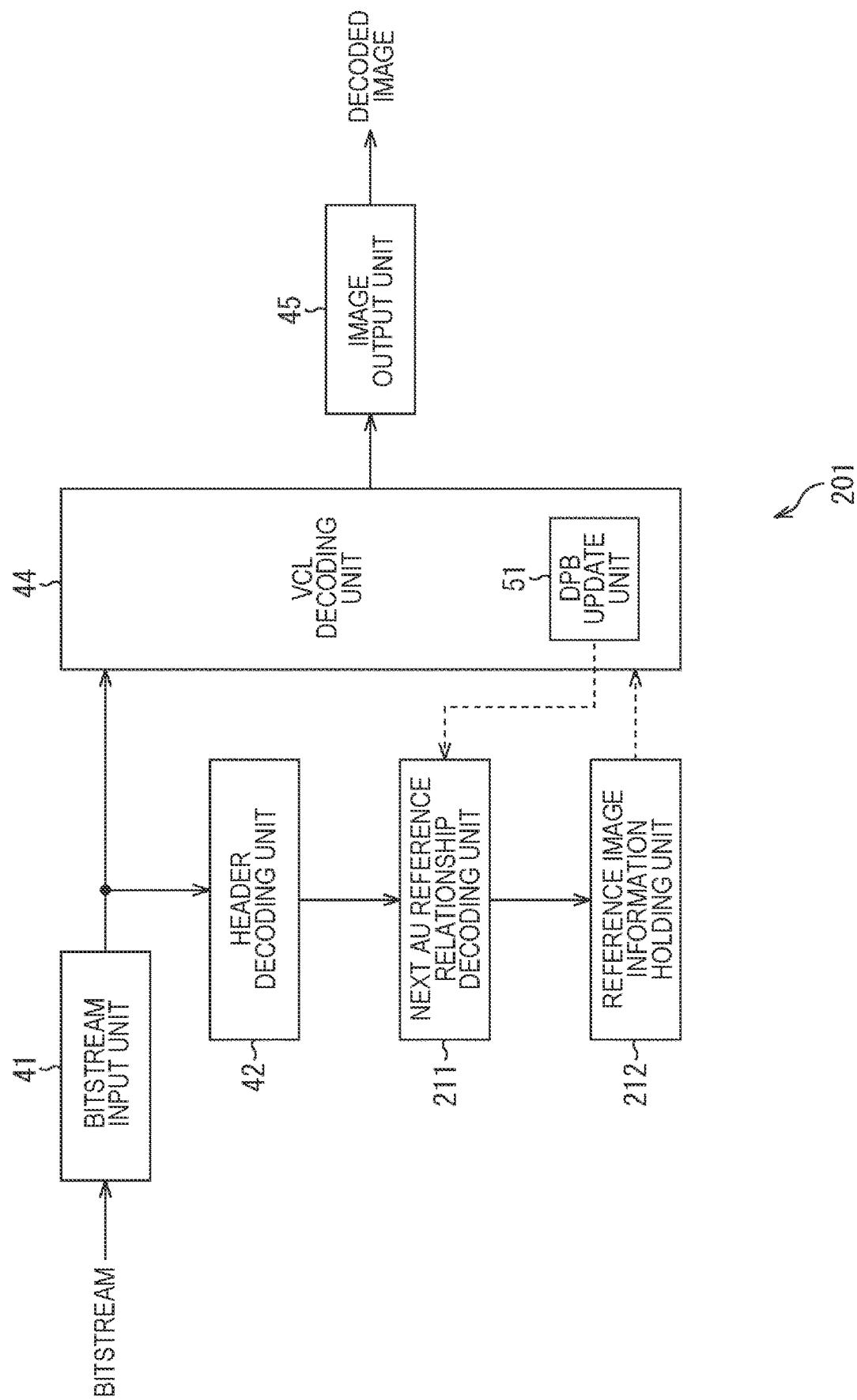

IMAGE PROCESSING APPARATUS AND METHOD

CROSS REFERENCE TO RELATED APPLICATIONS

This application is a U.S. National Phase of International Patent Application No. PCT/JP2020/022487 filed on Jun. 8, 2020, which claims priority benefit of Japanese Patent Application No. JP 2019-114623 filed in the Japan Patent Office on Jun. 20, 2019. Each of the above-referenced applications is hereby incorporated herein by reference in its entirety.

TECHNICAL FIELD

The present technology relates to an image processing apparatus and a method, and more particularly, to an image processing apparatus and a method that are designed to be able to shorten a delay from inputting of a stream till generation of a decoded image.

BACKGROUND ART

Image compression techniques that are widely used include MPEG2, advanced video coding (AVC), high efficiency video coding (HEVC), and the like (see Non-Patent Document 1).

To decode data compressed by these compression techniques, a decoding device first parses the header in the preprocessing, and extracts information about the picture to be decoded. The decoding device then generates a decoded image using the extracted information, and performs post-processing to generate the information to be an input in the decoding process for the next picture.

This series of processes needs to be sequentially performed.

CITATION LIST

Non-Patent Document

Non-Patent Document 1: T-REC-H.265-201802, [online], 2018-02-13, ITU, [searched on May 30, 2019], Internet, <https://www.itu.int/rec/T-REC-H.265-201802-I/en>

SUMMARY OF THE INVENTION

Problems to be Solved by the Invention

When preprocessing for interpreting a header and a decoded image generation process are sequentially performed in a system for streaming or the like that requires a low delay, it is difficult to generate a decoded image while the preprocessing is being performed.

Therefore, in the case of a system that instantly decodes and displays an input stream, it is necessary to allow a delay in display, as the preprocessing takes time. This hinders reductions in delay.

The present technology has been made in view of such circumstances, and aims to shorten a delay from inputting of a stream till generation of a decoded image.

Solutions to Problems

An image processing apparatus of one aspect of the present technology includes an encoded stream generation unit that generates an encoded stream by adding at least part of header information about a second access unit (AU) to be processed immediately after a first AU or information regarding at least part of the header information, to supplemental enhancement information (SEI) about the first AU.

In the one aspect of the present technology, an encoded stream is generated by adding at least part of header information about a second access unit (AU) to be processed immediately after a first AU or information regarding at least part of the header information, to supplemental enhancement information (SEI) about the first AU.

An image processing apparatus of another aspect of the present technology includes a decoding unit that decodes a second AU on the basis of header information that is processed upon receipt of an encoded stream, the encoded stream having been generated by adding at least part of the header information about the second AU to be processed immediately after a first AU or information regarding at least part of the header information, to SEI about the first AU.

In another aspect of the present technology, a second AU is decoded on the basis of header information that is processed upon receipt of an encoded stream, the encoded stream having been generated by adding at least part of the header information about the second AU to be processed immediately after a first AU or information regarding at least part of the header information, to SEI about the first AU.

BRIEF DESCRIPTION OF DRAWINGS

FIG. 13 is a chart showing an example of the information that needs to be transformed into SEI in the case of AVC.

FIG. 14 is a chart showing an example of the information that needs to be transformed into SEI in the case of HEVC.

FIG. 15 is a chart showing an example of the syntax parameters necessary in RefPicList generation in the case of AVC.

FIG. 16 is a block diagram showing an example configuration of a decoding device to which the present technology is applied.

MODES FOR CARRYING OUT THE INVENTION

The following is a description of modes for carrying out the present technology. Explanation will be made in the following order.

1. Overview
2. Encoding device
3. Decoding device
4. Other aspects

<<1. Overview>>

<Configuration of a Conventional Encoding Device>

Figure 1:
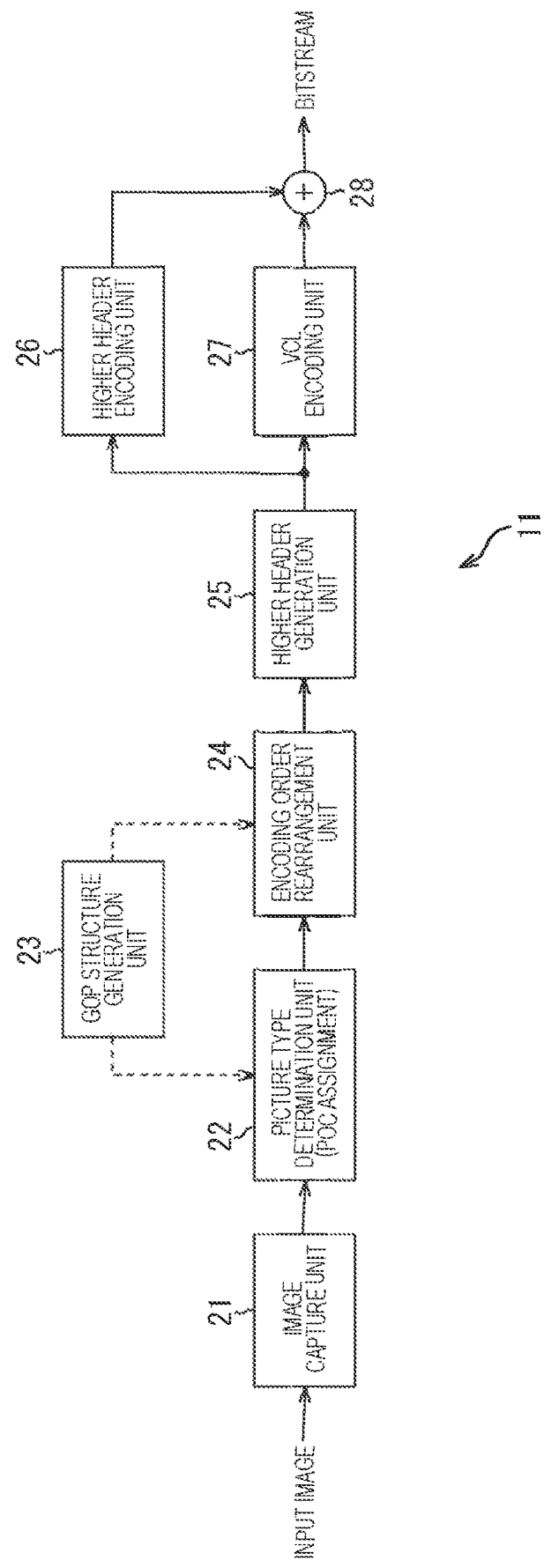
FIG. 1 is a block diagram showing an example configuration of a conventional encoding device.

FIG. 1 is a block diagram showing an example configuration of a conventional encoding device.

An encoding device 1 includes an image capture unit 21, a picture type determination unit 22, a group of pictures (GOP) structure generation unit 23, an encoding order rearrangement unit 24, a higher header generation unit 25, a higher header encoding unit 26, a video coding layer (VCL) encoding unit 27, and an arithmetic unit 28.

The image capture unit 21 captures images input from the previous stage, and outputs the captured images to the picture type determination unit 22.

The picture type determination unit 22 determines the picture type of the images supplied from the image capture unit 21, on the basis of GOP information that is supplied from the GOP structure generation unit 23 and indicates the GOP structure. The picture type determination unit 22 also assigns a picture order count (POC) to each image. The picture type determination unit 22 outputs the images that have the picture type determined and the POCs assigned thereto, to the encoding order rearrangement unit 24.

The GOP structure generation unit 23 determines a GOP structure, and outputs GOP information indicating the determined GOP structure to the picture type determination unit 22 and the encoding order rearrangement unit 24.

The encoding order rearrangement unit 24 rearranges images that have been arranged in the display order, in the encoding order. The encoding order rearrangement unit 24 outputs the rearranged images to the higher header generation unit 25.

The higher header generation unit 25 generates a higher header that is a header of a higher-level syntax, by referring to the images supplied from the encoding order rearrangement unit 24. The higher-level syntax is a sequence parameter set (SPS), a picture parameter set (PPS), supplemental enhancement information (SEI), or the like, for example. The higher header generation unit 25 outputs the generated higher header to the higher header encoding unit 26. The higher header generation unit 25 outputs the images to the VCL encoding unit 27.

The higher header encoding unit 26 encodes the higher header supplied from the higher header generation unit 25. The higher header encoding unit 26 outputs the encoded higher header to the arithmetic unit 28.

The VCL encoding unit 27 encodes the images supplied from the higher header generation unit 25, and generates a VCL. The VCL is compressed data of the images excluding the header. The VCL encoding unit 27 outputs the generated VCL to the arithmetic unit 28.

The arithmetic unit 28 adds the higher header supplied from the higher header encoding unit 26 to the VCL supplied from the VCL encoding unit 27. The arithmetic unit 28 outputs a bitstream including the higher header and the VCL to a decoding device or the like in the stage that follows.

<Configuration of a Conventional Decoding Device>

Figure 2:
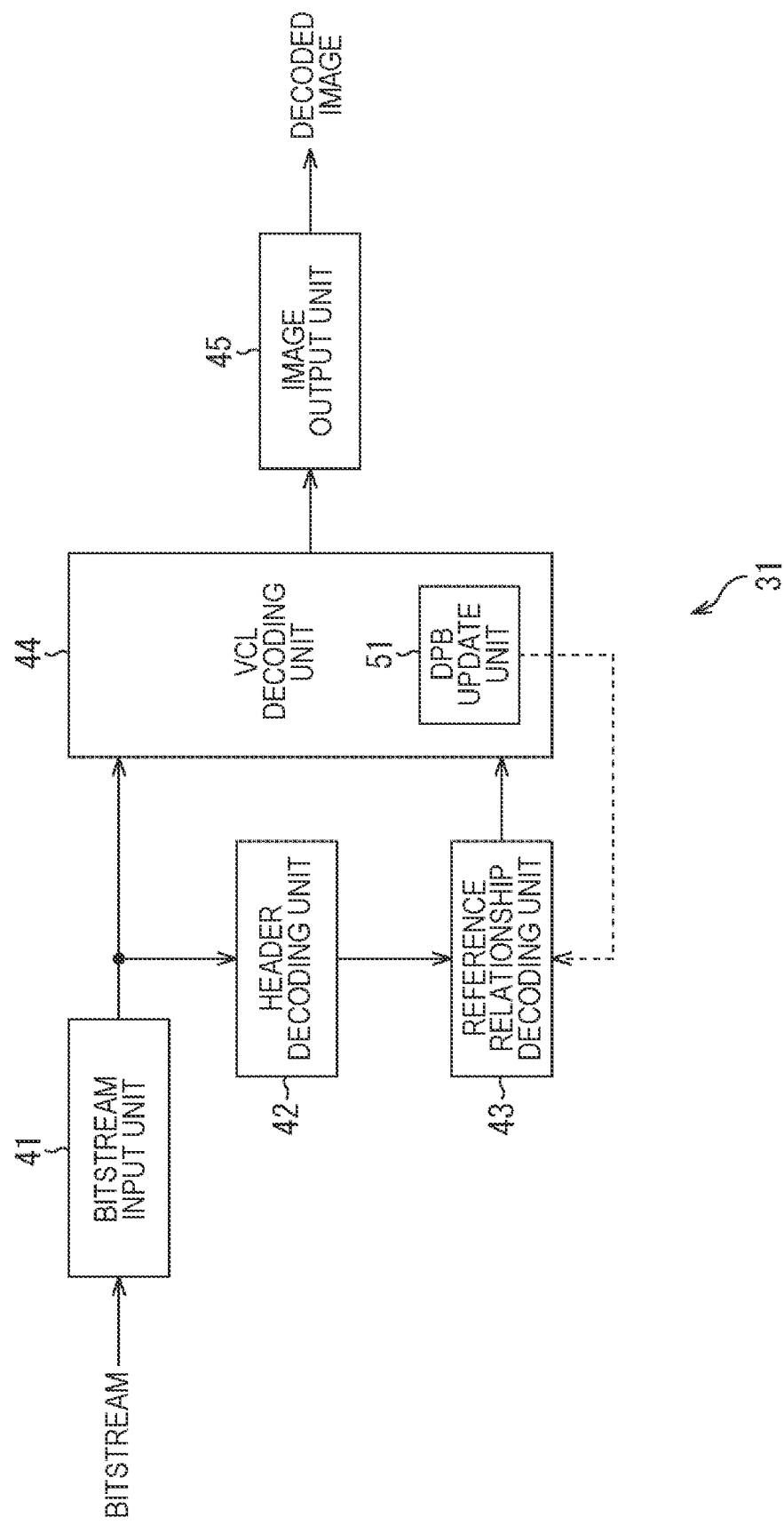
FIG. 2 is a block diagram showing an example configuration of a conventional decoding device.

FIG. 2 is a block diagram showing an example configuration of a conventional decoding device.

A decoding device 31 includes a bitstream input unit 41, a header decoding unit 42, a reference relationship decoding unit 43, a VCL decoding unit 44, and an image output unit 45.

A bitstream from the previous stage is supplied to the bitstream input unit 41.

The bitstream input unit 41 outputs the bitstream to the header decoding unit 42 and the VCL decoding unit 44.

The header decoding unit 42 and the reference relationship decoding unit 43 perform preprocessing including header parsing, parameter calculation, and reference image information (RefPicList) generation, on the bitstream.

The header decoding unit 42 interprets picture header information (a picture header or a slice header) in parsing the header. The header decoding unit 42 outputs the interpreted header information to the reference relationship decoding unit 43.

On the basis of the header information supplied from the header decoding unit 42, the reference relationship decoding unit 43 calculates parameters necessary in the process of decoding images, such as POCs, for example, and generates a RefPicList.

The VCL decoding unit 44 decodes the images and reconstructs a decoded image, while referring to the information generated in the preprocessing as needed. The VCL decoding unit 44 outputs the reconstructed decoded image to the image output unit 45. The VCL decoding unit 44 also includes a decoded picture buffer (DPB) update unit 51.

The DPB update unit 51 updates the DPB in post-processing, and outputs DPB update information to the reference relationship decoding unit 43. The reference relationship decoding unit 43 updates the RefPicList, on the basis of the DPB update information.

The image output unit 45 outputs the decoded image supplied from the VCL decoding unit 44 to a display unit or the like in the stage that follows.

<Timing of Each Process in the Decoding Device>

Figure 3:
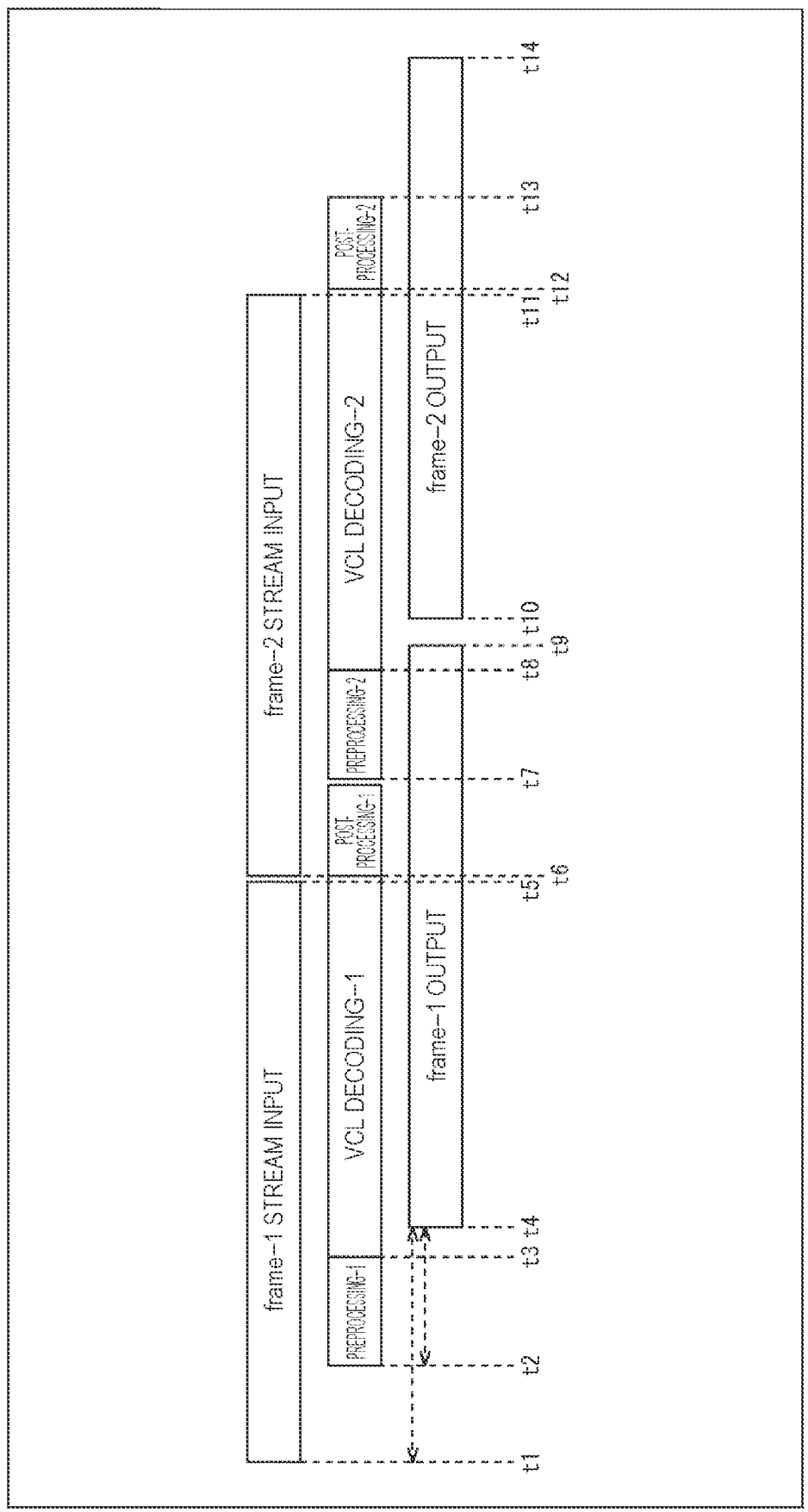
FIG. 3 is a chart showing the timings of the respective processes in the decoding device.

FIG. 3 is a chart showing the timings of the respective processes in the decoding device 31 shown in FIG. 2. The abscissa axis indicates the flow of time. Note that the branch number of frame-1 means "the first". Accordingly, frame-1 represents the first frame. The same applies in the following drawings.

At time t1, the input of the frame-1 stream is started.

Preprocessing-1 for frame-1 is started at time t2, and preprocessing-1 is ended at time t3. At time t3 when preprocessing-1 is ended, VCL decoding-1 is started, and at time t4 after that, the output of frame-1 is finally started.

At time t5, the input of the frame-1 stream is ended. At time t6 immediately after that, the input of the frame-2 stream is started, VCL decoding-1 is ended, and post-processing-1 is started.

At time t7, post-processing-1 is ended, and preprocessing-2 for frame-2 is started. At time t8 when the preprocessing-2 is ended, VCL decoding-2 is started. At time t9 after that, the output of frame-1 is ended, and, at time t10, the output of frame-2 is finally started.

At time t11, the input of the frame-2 stream is ended. At time t12 immediately after that, VCL decoding-2 is ended. Post-processing-2 is then ended at time t13, and the output of frame-2 is ended at time t14.

As described above, in the conventional decoding device 31, the delay from time t1 of the stream input or time t2 of the decoding start to time t4 of the output start needs to be so great as to include at least the time of preprocessing-1.

<Operation of the Decoding Device>

Figure 4:
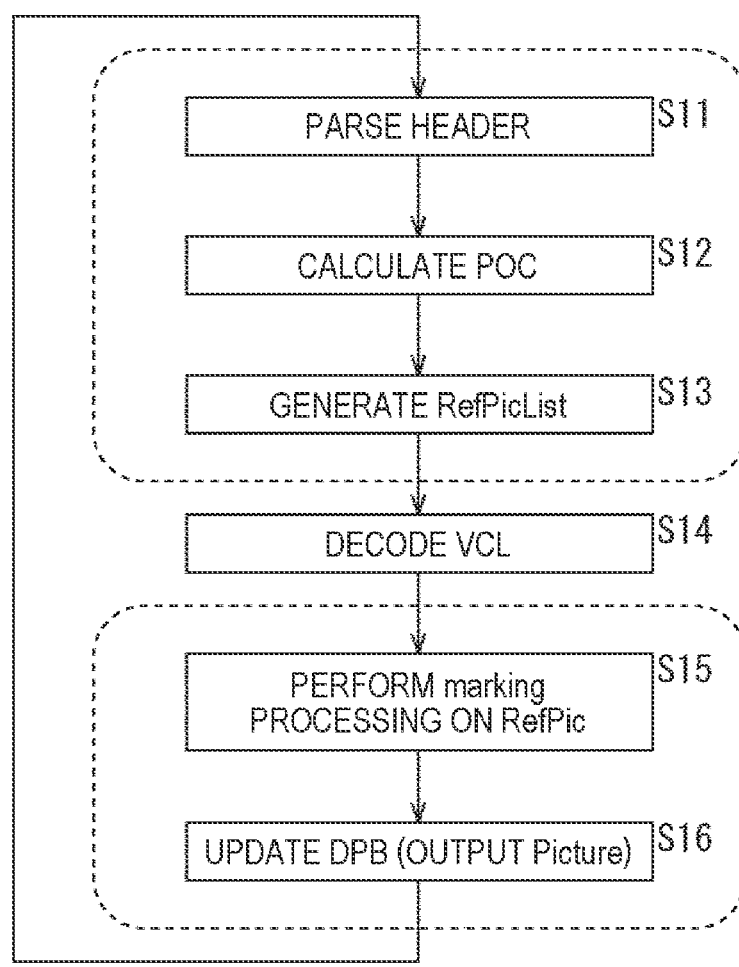
FIG. 4 is a flowchart for explaining an example of a decoding process to be performed by the decoding device shown in FIG. 2.

FIG. 4 is a flowchart for explaining an example of a decoding process to be performed by the decoding device 31 shown in FIG. 2.

In step S11, the header decoding unit 42 parses the header for a bitstream in preprocessing. The header decoding unit 42 outputs the header information interpreted by parsing the header, to the reference relationship decoding unit 43.

In step S12, the reference relationship decoding unit 43 calculates POCs in the preprocessing.

In step S13, the reference relationship decoding unit 43 generates a RefPicList in the preprocessing.

In step S14, the VCL decoding unit 44 decodes and reconstructs an image (VCL), while referring to the information generated in the preprocessing as needed.

In step S15, the VCL decoding unit 44 performs a marking process on the RefPic in post-processing.

In step S16, the DPB update unit 51 updates the decoded picture buffer (DPB) in the post-processing, and the image output unit 45 outputs a picture (decoded image) in the post-processing. The update information about the DPB updated in step S16 is used in the next preprocessing.

After step S16, the process returns to step S11, and the processes that follow are repeated for the next picture.

As described above, steps S11 to S13 in FIG. 4 are the preprocessing. If the preprocessing is not completed, the VCL decoding in step S14 cannot be started. Meanwhile, steps S15 and S16 in FIG. 4 are the post-processing. The post-processing can proceed before the VCL decoding is completed. Note that the preprocessing of the next picture cannot be started, unless the post-processing of the previous picture is completed.

<Example of a Process Sequence in the Decoding Device>

Figure 5:
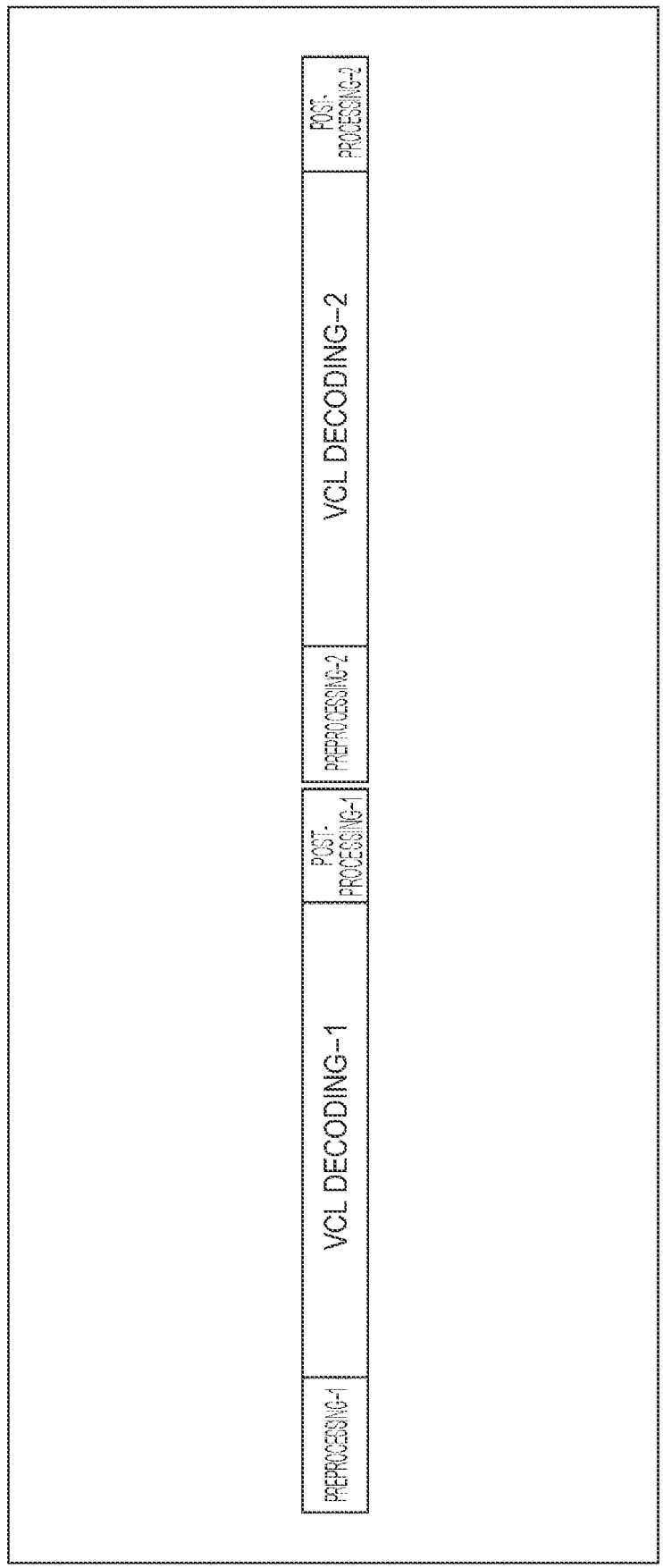
FIG. 5 is a chart showing an example of a process sequence in the decoding device.

FIG. 5 is a chart showing an example of a process sequence in the decoding device 31 shown in FIG. 2.

The decoding device 31 performs VCL decoding-1 of a frame 1 immediately after preprocessing-1 of the frame 1. The decoding device 31 performs post-processing-1 of the frame 1 after VCL decoding-1 of the frame 1. The decoding device 31 also performs preprocessing-2 of a frame 2 after post-processing-1 of the frame 1. The decoding device 31 performs VCL decoding-2 of the frame 2 after preprocessing-2 of the frame 2. The decoding device 31 performs post-processing-2 of the frame 2 after VCL decoding-2 of the frame 2.

As described above, in the decoding device 31, the respective processes are successively performed.

Figure 6:
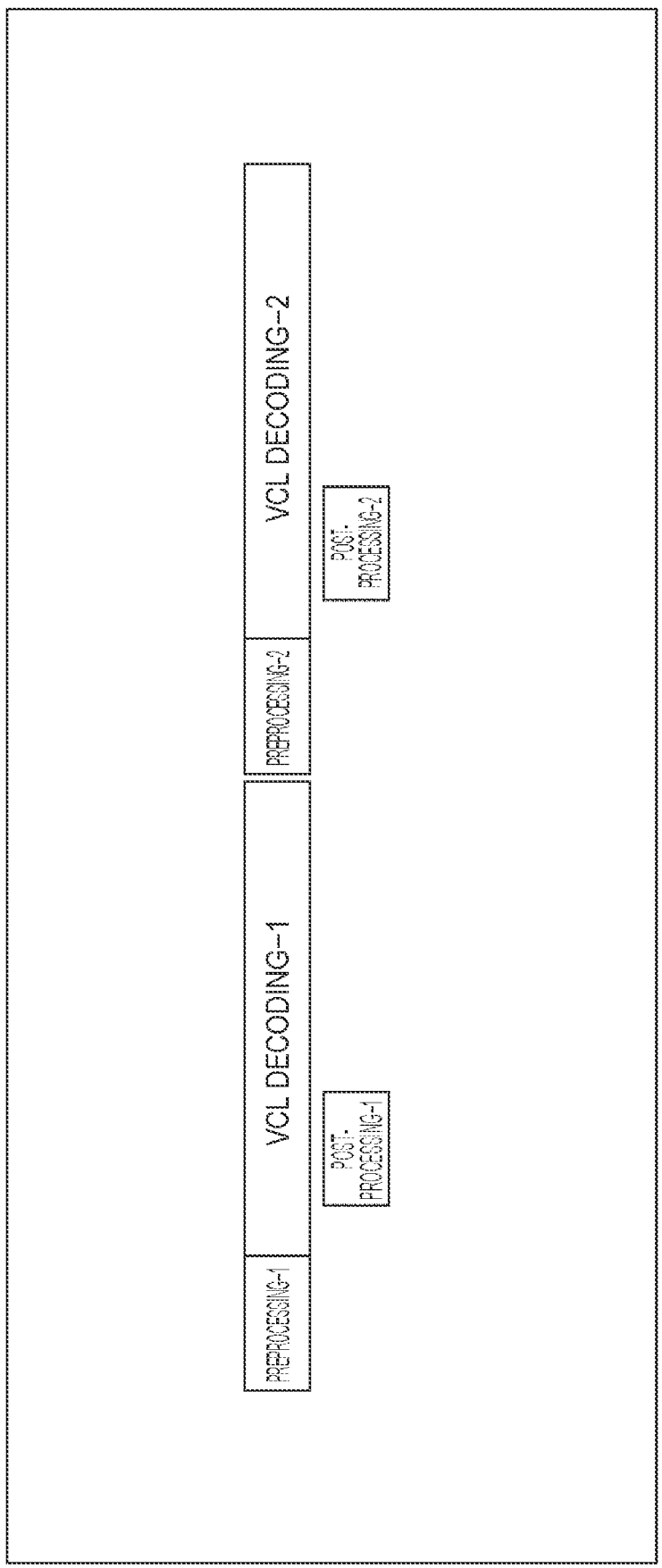
FIG. 6 is a chart showing another example of a process sequence in the decoding device.

FIG. 6 is a chart showing another example of a process sequence in the decoding device 31 shown in FIG. 2.

FIG. 6 shows an example in which post-processing is performed before VCL decoding is completed.

After completing preprocessing-1 of the frame 1, the decoding device 31 performs VCL decoding-1 of the frame 1. In the middle of VCL decoding-1 of the frame 1, the decoding device 31 performs post-processing-1 of the frame 1 in parallel with VCL decoding-1 of the frame 1. Accordingly, the decoding device 31 can perform preprocessing-2 of the frame 2 immediately after completing VCL decoding-1 of the frame 1.

Likewise, after completing preprocessing-2 of the frame 2, the decoding device 31 performs VCL decoding-2 of the frame 2. In the middle of VCL decoding-2 of the frame 2, the decoding device 31 performs post-processing-2 of the frame 2 in parallel with VCL decoding-2 of the frame 2. Accordingly, the decoding device 31 can perform preprocessing-3 of the next frame 3 immediately after completing VCL decoding-2 of the frame 2, though not shown in the drawing.

As described above, when preprocessing for interpreting a header and a decoded image generation process are sequentially performed in a system for streaming or the like that requires a low delay, the generation of a decoded image is suspended while the preprocessing is performed.

In the case of a system that instantly decodes and displays an input stream, it is necessary to allow a delay in display, as the preprocessing takes time. This hinders reductions in delay.

Here, the header information about the next access unit (the AU to be processed immediately after each AU) in the processing order of the respective AUs includes information that is required beforehand when the decoding side performs the preprocessing of each AU. This information is information that can be generated beforehand when the encoding side creates the higher header of each AU at the latest.

Note that an AU is a group of network abstraction layer (NAL) units from which one valid picture (frame) can be generated. In other words, an AU represents a picture (frame). Hereinafter, a picture (frame) will also be referred to as an AU.

Therefore, in the present technology, information regarding at least part of the header information about the second AU to be processed after the first AU, or information regarding at least part of the header information is added to the SEI about the first AU, so that an encoded stream is generated. In this manner, a delay in decoding can be shortened.

<Configuration of a Stream of the Present Technology>

Figure 7:
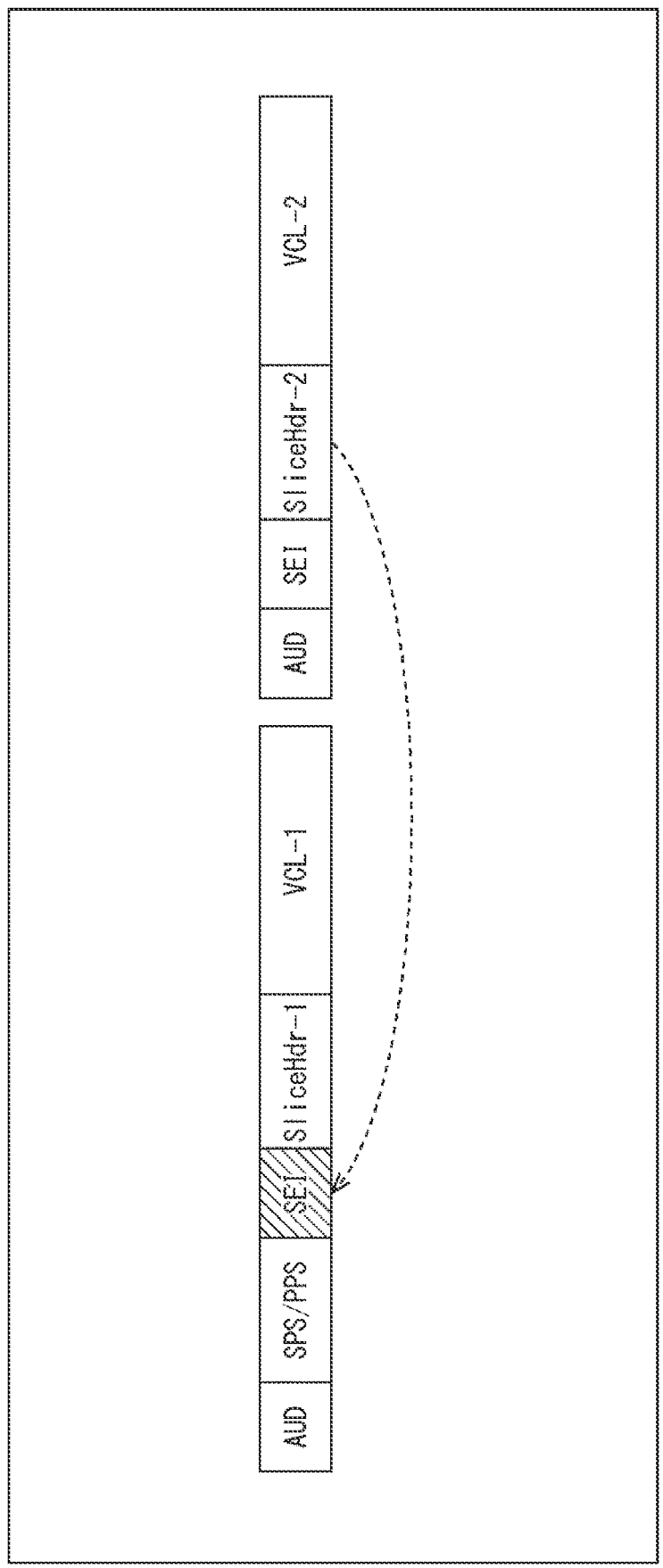
FIG. 7 is a chart showing an example configuration of a stream to which the present technology is applied.

FIG. 7 is a chart showing an example configuration of a stream to which the present technology is applied.

In FIG. 7, the first AU and the second AU are shown in this order from the left.

The first AU includes an access unit delimiter (AUD), SPS/PPS, SEI, SliceHdr (Header)-1, and VCL-1. The second AU includes an AUD, SEI, SliceHdr-2, and VCL-2.

In the present technology, SliceHdr-2 of the second AU is added to the SEI about the first AU, as indicated by a dashed-line arrow in FIG. 7. That is, SliceHdr-2 of the Nth (N>1) AU is added to the SEI about the (N−1)th AU.

Note that, in a low-delay system, most syntax parameters that change are limited. Therefore, an encoding device may extract only the parameters that vary with each picture among the parameters of SliceHdr-2, and add the extracted minimum parameters to the SEI. Also, the parameters may include the parameter and the like described later with reference to FIGS. 13 to 15.

Figure 8:
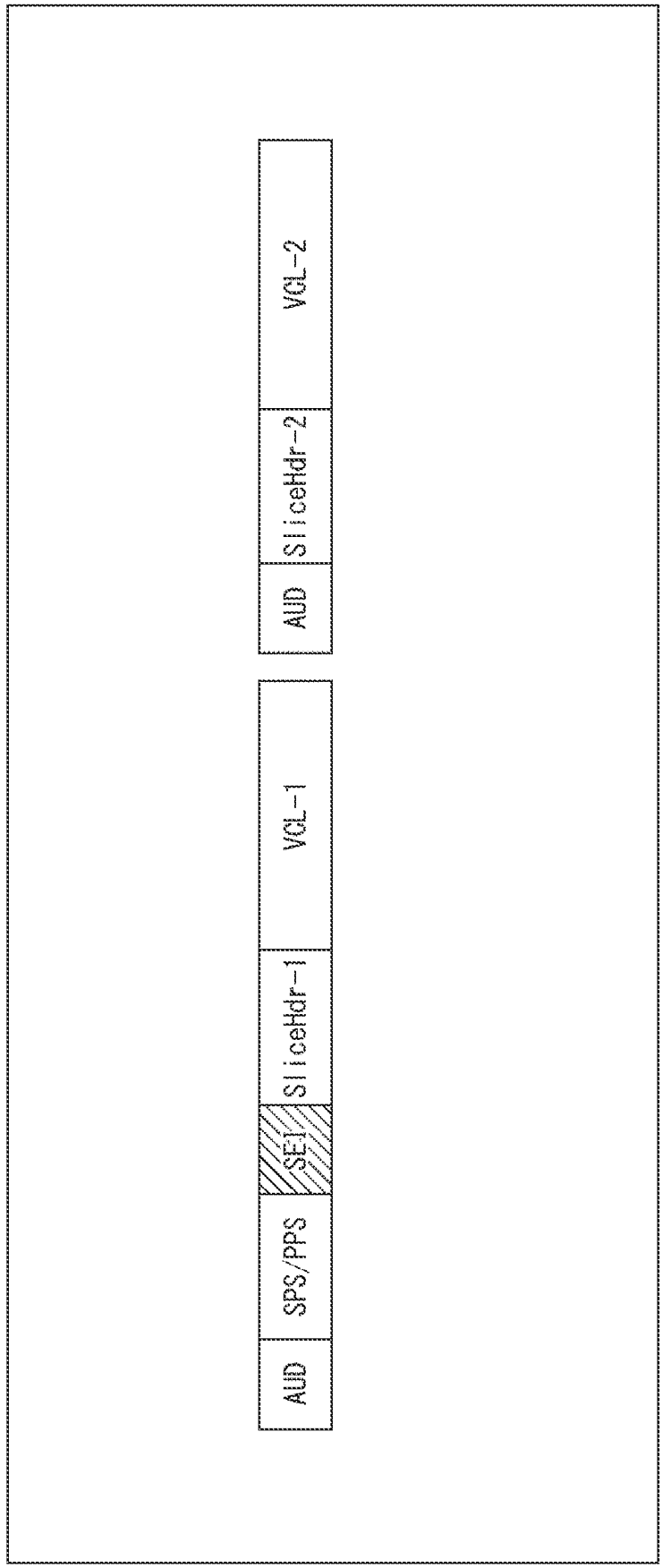
FIG. 8 is a chart showing another example configuration of a stream to which the present technology is applied.

FIG. 8 is a chart showing another example configuration of a stream to which the present technology is applied.

In FIG. 8, the first (top) AU and the second AU in the GOP are shown in this order from the left.

The first AU includes an AU, an SPS/PPS, SEI, SliceHdr-1, and VCL-1. The second AU includes an AUD, SliceHdr-2, and VCL-2.

In the case of the stream shown in FIG. 8, information necessary in the preprocessing of the respective pictures of one GOP is collectively added to the SEI at the head of the GOP.

The information necessary in the preprocessing may be the parameters and the like described later with reference to FIGS. 13 to 15, but may also be only the parameters that change with each picture as described above or all the slice headers of the head slices of the pictures. Further, information necessary in the preprocessing may be narrowed down from among those slice headers. Note that this also applies in the case illustrated in FIG. 7.

In the case of a limited operation, the encoding device can create the parameters beforehand. That is, the encoding device can prepare the generation pattern (generation rule) of the necessary parameters in advance. Therefore, on the encoding side, a generation pattern prepared in advance, instead of the information necessary in the preprocessing, may be added to the first AU, or to the SEI about the top AU in the GOP.

Note that, in this case, the SliceHdrs of the AUs are only used for answer checking later, and is not used in the actual preprocessing.

With the above arrangement, the waiting time from the input of a bitstream to the start of VCL decoding is shortened. Thus, the decoding device can efficiently perform each process.

<<2. Encoding Device>>
<Example Configuration of an Encoding Device>

Figure 9:
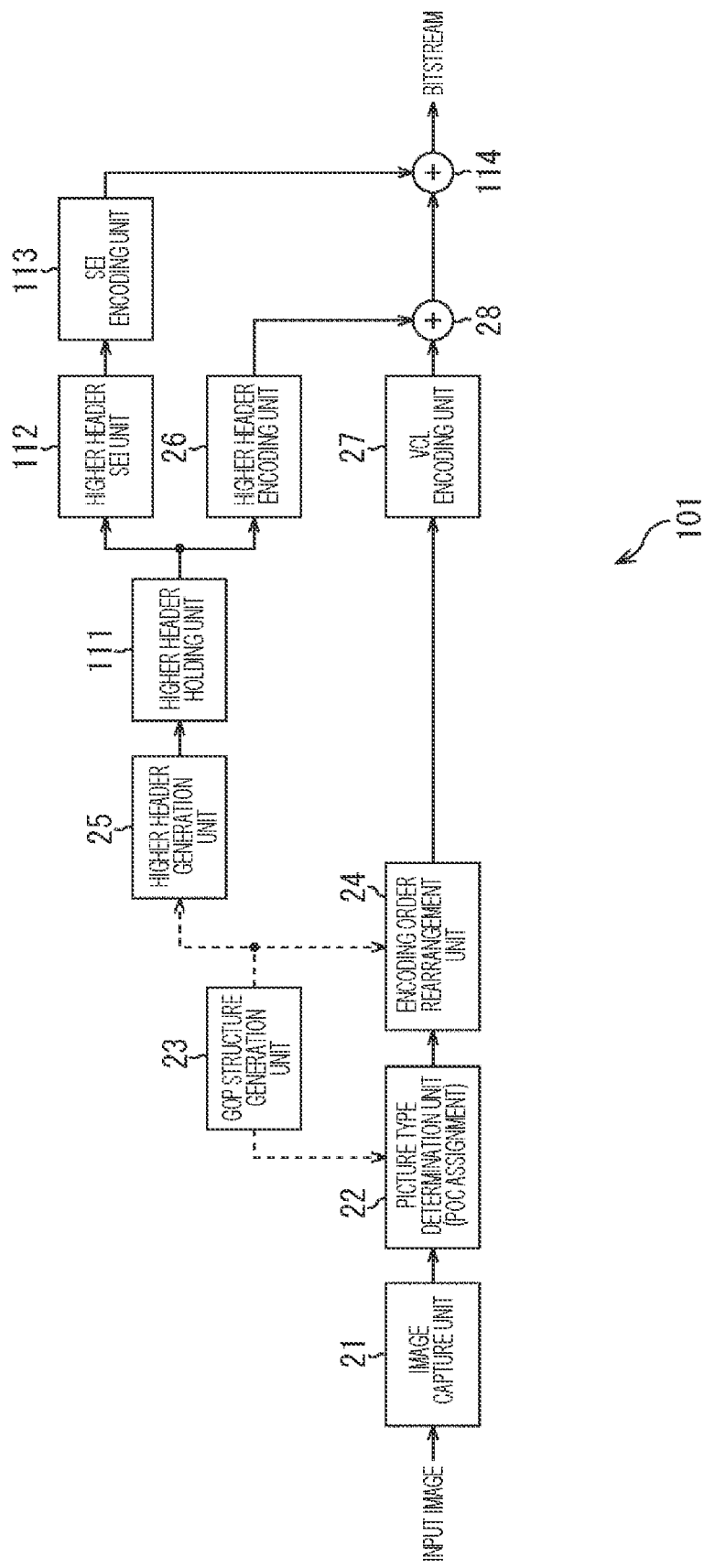
FIG. 9 is a block diagram showing an example configuration of an encoding device to which the present technology is applied.

FIG. 9 is a block diagram showing an example configuration of an encoding device to which the present technology is applied. In the configuration shown in FIG. 9, the same components as those described with reference to FIG. 1 are denoted by the same reference numerals as those used in FIG. 1. The explanations that have already been made will not be repeated below.

An encoding device 101 in FIG. 9 includes an image capture unit 21, a picture type determination unit 22, a GOP structure generation unit 23, an encoding order rearrangement unit 24, a higher header generation unit 25, a higher header encoding unit 26, a VCL encoding unit 27, and an arithmetic unit 28. The encoding device 101 further includes a higher header holding memory 111, a higher header SEI unit 112, an SEI encoding unit 113, and an arithmetic unit 114.

The encoding device 101 differs from the encoding device 1 shown in FIG. 1 in that the higher header holding memory 111, the higher header SEI unit 112, the SEI encoding unit 113, and the arithmetic unit 114 are added.

The encoding device 101 in FIG. 9 recognizes or predetermines the GOP structure of the stream to be generated, and performs an encoding process in accordance with the GOP structure. Accordingly, before encoding each AU, the encoding device 101 can generate a picture reference relationship and header information in advance.

The higher header generation unit 25 generates a picture reference relationship and header information in advance. The higher header generation unit 25 causes the higher header holding memory 111 to hold the generated higher header.

The higher header holding memory 111 holds the higher header.

The higher header encoding unit 26 encodes the higher header of the picture being currently encoded, using the higher header held in the higher header holding memory 111. The higher header encoding unit 26 outputs the encoded higher header to the arithmetic unit 28.

The higher header SEI unit 112 generates the higher header of the next picture from the higher header held in the higher header holding memory 111, and transforms the higher header of the next picture into SEI, or Userdata of SEI, for example. The higher header SEI unit 112 outputs the SEI, which is the higher header transformed into SEI, to the SEI encoding unit 113.

The SEI encoding unit 113 encodes the SEI. The SEI encoding unit 113 outputs the encoded SEI, which is the SEI subjected to the encoding, to the arithmetic unit 114.

The arithmetic unit 28 adds the higher header supplied from the higher header encoding unit 26 to the VCL supplied from the VCL encoding unit 27. The arithmetic unit 28 generates a bitstream including the higher header and the VCL, and outputs the bitstream to the arithmetic unit 114.

The arithmetic unit 114 adds the encoded SEI to the bitstream including the higher header and the VCL. The arithmetic unit 114 outputs the bitstream including the higher header, the encoded SEI, and the VCL, to a decoding device in the stage that follows, for example.

When the encoding device 101 is an encoding device that determines a GOP structure at the top of an encoding process, the encoding device 101 may generate header information for one GOP at the head of a GOP, and add the generated header information for one GOP as Userdata to the sequence or the head of the GOP. In this case, on the decoding side, the header information for one GOP is reconstructed at the timing of decoding of the head of the GOP.

<Configuration of the VCL Encoding Unit>

Figure 10:
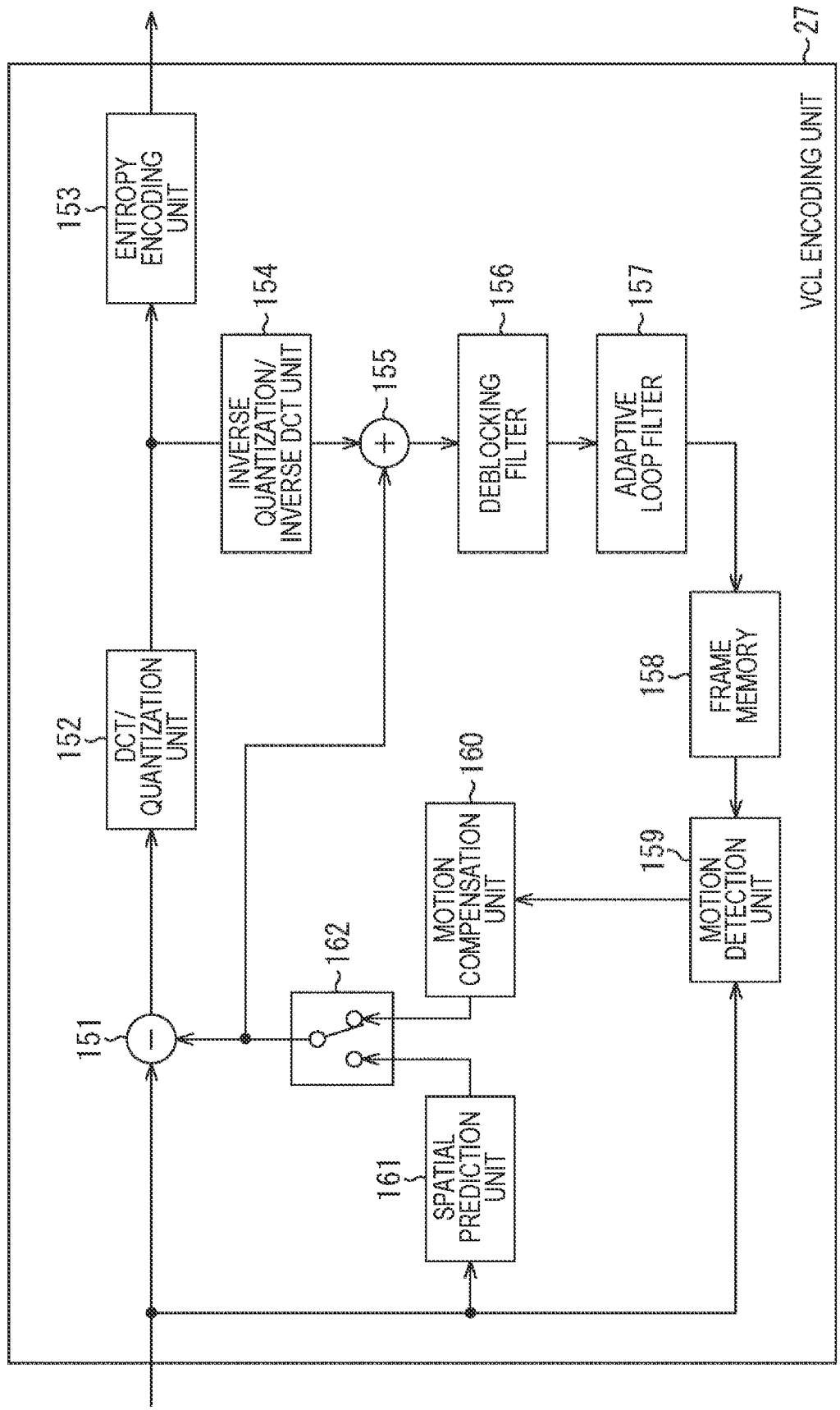
FIG. 10 is a block diagram showing an example configuration of a VCL encoding unit.

FIG. 10 is a block diagram showing an example configuration of the VCL encoding unit 27.

In FIG. 10, the VCL encoding unit 27 includes an arithmetic unit 151, a DCT/quantization unit 152, an entropy encoding unit 153, an inverse quantization/inverse DCT unit 154, an arithmetic unit 155, a deblocking filter 156, and an adaptive loop filter 157. The VCL encoding unit 27 further includes a frame memory 158, a motion detection unit 159, a motion compensation unit 160, a spatial prediction unit 161, and a selector 162.

An input image input from the previous stage is supplied to the arithmetic unit 151, the spatial prediction unit 161, and the motion detection unit 159.

The arithmetic unit 151 calculates a difference between the input image and a predicted image supplied from the selector 162, and outputs the calculated difference image to the DCT/quantization unit 152.

The DCT/quantization unit 152 performs DCT on the difference image supplied from the arithmetic unit 151. The DCT/quantization unit 152 quantizes the image subjected to the DCT, and outputs the quantized image to the entropy encoding unit 153 and the inverse quantization/inverse DCT unit 154.

The entropy encoding unit 153 performs entropy encoding on the quantized image supplied from the DCT/quantization unit 152, and outputs a VCL that is an image obtained as a result of the encoding, to the arithmetic unit 28 in the stage that follows.

The inverse quantization/inverse DCT unit 154 performs inverse quantization on the quantized image supplied from the DCT/quantization unit 152, to obtain the image subjected to the DCT. The inverse quantization/inverse DCT unit 154 performs inverse DCT on the image subjected to the DCT, to obtain the difference image. The difference image is supplied to the arithmetic unit 155.

The arithmetic unit 155 adds the difference image supplied from the inverse quantization/inverse DCT unit 154 to the predicted image supplied from the selector 162, to generate a decoded image. The arithmetic unit 155 outputs the generated decoded image to the deblocking filter 156.

The deblocking filter 156 performs a deblocking filtering process on the decoded image supplied from the arithmetic unit 155, and outputs the decoded image subjected to the deblocking filtering process, to the adaptive loop filter 157.

The adaptive loop filter (ALF) 157 performs an ALF process on the decoded image subjected to the deblocking filtering process, and supplies the image subjected to the ALF process, to the frame memory 158.

The motion detection unit 159 and the motion compensation unit 160 perform inter prediction on an input image.

The motion detection unit 159 detects a motion vector, using the input image and a reference image in the frame memory 158. The motion detection unit 159 outputs the detected motion vector to the motion compensation unit 160.

Using the motion vector supplied from the motion detection unit 159, the motion compensation unit 160 performs motion compensation, and generates an inter predicted image. The inter predicted image is output to the selector 162.

The spatial prediction unit 161 performs intra prediction on the input image, to generate an intra predicted image. The intra predicted image is output to the selector 162.

The selector 162 selects the predicted image having a predetermined cost function indicating an optimum value, between the inter predicted image and the intra predicted image. The selector 162 outputs the selected predicted image to the arithmetic unit 151 and the arithmetic unit 155.

<Operation of the Encoding Device>

Figure 11:
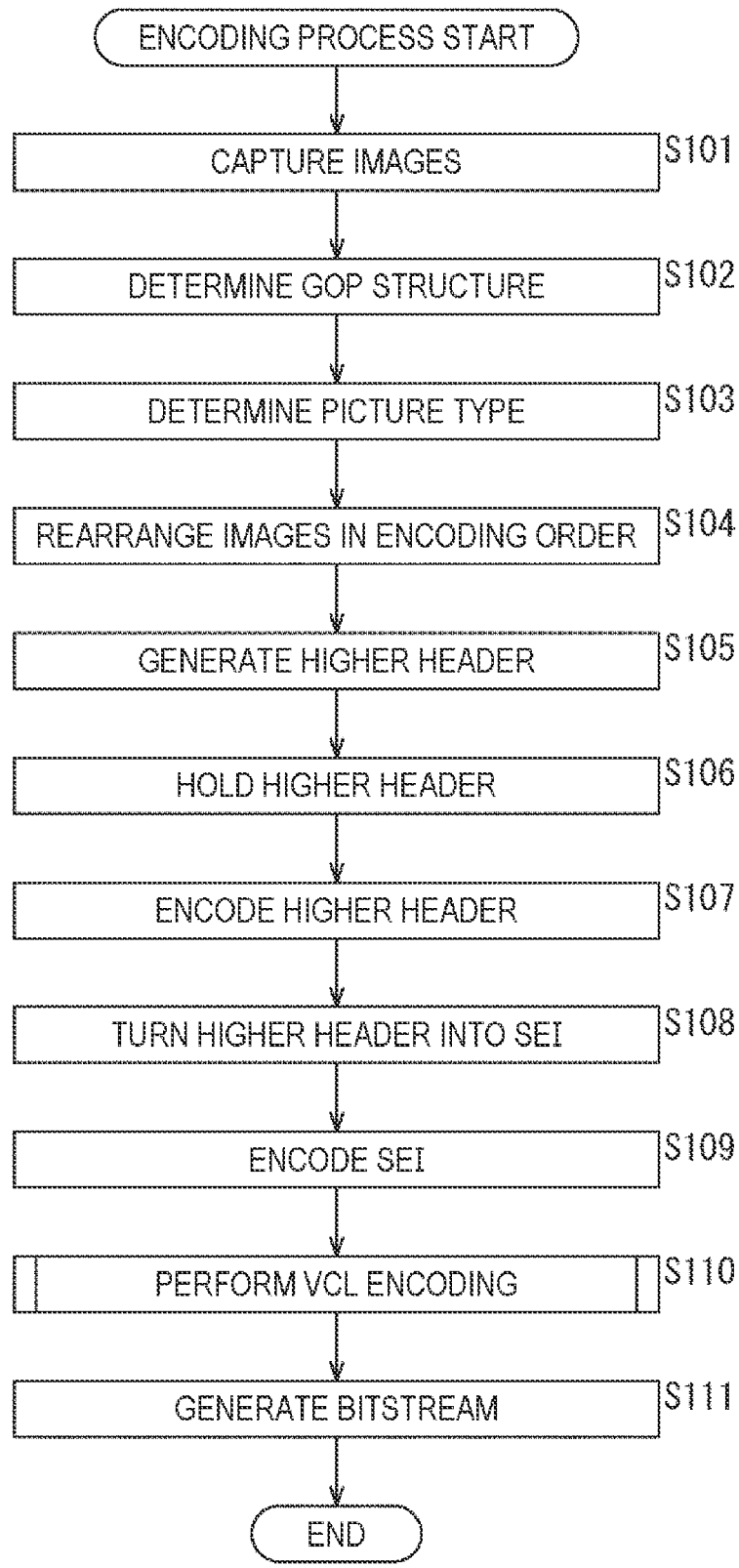
FIG. 11 is a flowchart for explaining an encoding process to be performed by the encoding device shown in FIG. 9.

FIG. 11 is a flowchart for explaining an encoding process to be performed by the encoding device 101 shown in FIG. 9.

In step S101, the image capture unit 21 captures images input from the previous stage, and outputs the captured images to the picture type determination unit 22.

In step S102, the GOP structure generation unit 23 determines the GOP structure. The GOP structure generation unit 23 outputs GOP information indicating the determined GOP structure to the picture type determination unit 22 and the encoding order rearrangement unit 24.

In step S103, the picture type determination unit 22 determines the picture type of the images supplied from the image capture unit 21, on the basis of the GOP information supplied from the GOP structure generation unit 23.

In step S104, the encoding order rearrangement unit 24 rearranges the images that have been arranged in the display order, in the encoding order. The encoding rearrangement unit 24 outputs the rearranged images to the higher header generation unit 25.

In step S105, the higher header generation unit 25 generates a higher header, by referring to the images supplied from the encoding rearrangement unit 24.

In step S106, the higher header holding memory 111 holds the higher header generated by the higher header generation unit 25.

In step S107, the higher header encoding unit 26 encodes the higher header of the AU to be the encoding target (hereinafter referred to as the current AU), using the higher header held in the higher header holding memory 111. The higher header encoding unit 26 outputs the encoded higher header to the arithmetic unit 28.

In step S108, the higher header SEI unit 112 generates the higher header of the next AU immediately after the current AU in the processing order, from the higher header held in the higher header holding memory 111. The higher header SEI unit 112 then transforms the higher header of the next AU into Userdata of SEI. The higher header SEI unit 112 outputs the SEI, which is the higher header transformed into SEI, to the SEI encoding unit 113.

In step S109, the SEI encoding unit 113 encodes the SEI. The SEI encoding unit 113 outputs the encoded SEI, which is the SEI subjected to the encoding, to the arithmetic unit 114.

In step S110, the VCL encoding unit 27 performs VCL encoding on the images supplied from the encoding order rearrangement unit 24, to generate a VCL. This VCL encoding process will be described later in detail, with reference to FIG. 12. The VCL encoding unit 27 outputs the generated VCL to the arithmetic unit 28.

In step S111, the arithmetic unit 28 and the arithmetic unit 114 generate a bitstream. That is, the arithmetic unit 28 adds the higher header supplied from the higher header encoding unit 26 to the VCL supplied from the VCL encoding unit 27. The arithmetic unit 28 generates a bitstream including the higher header and the VCL, and outputs the bitstream to the arithmetic unit 114. The arithmetic unit 114 adds the encoded SEI to the bitstream including the higher header and the VCL. The arithmetic unit 114 outputs the bitstream including the higher header, the encoded SEI, and the VCL, to a decoding device in the stage that follows, for example.

Figure 12:
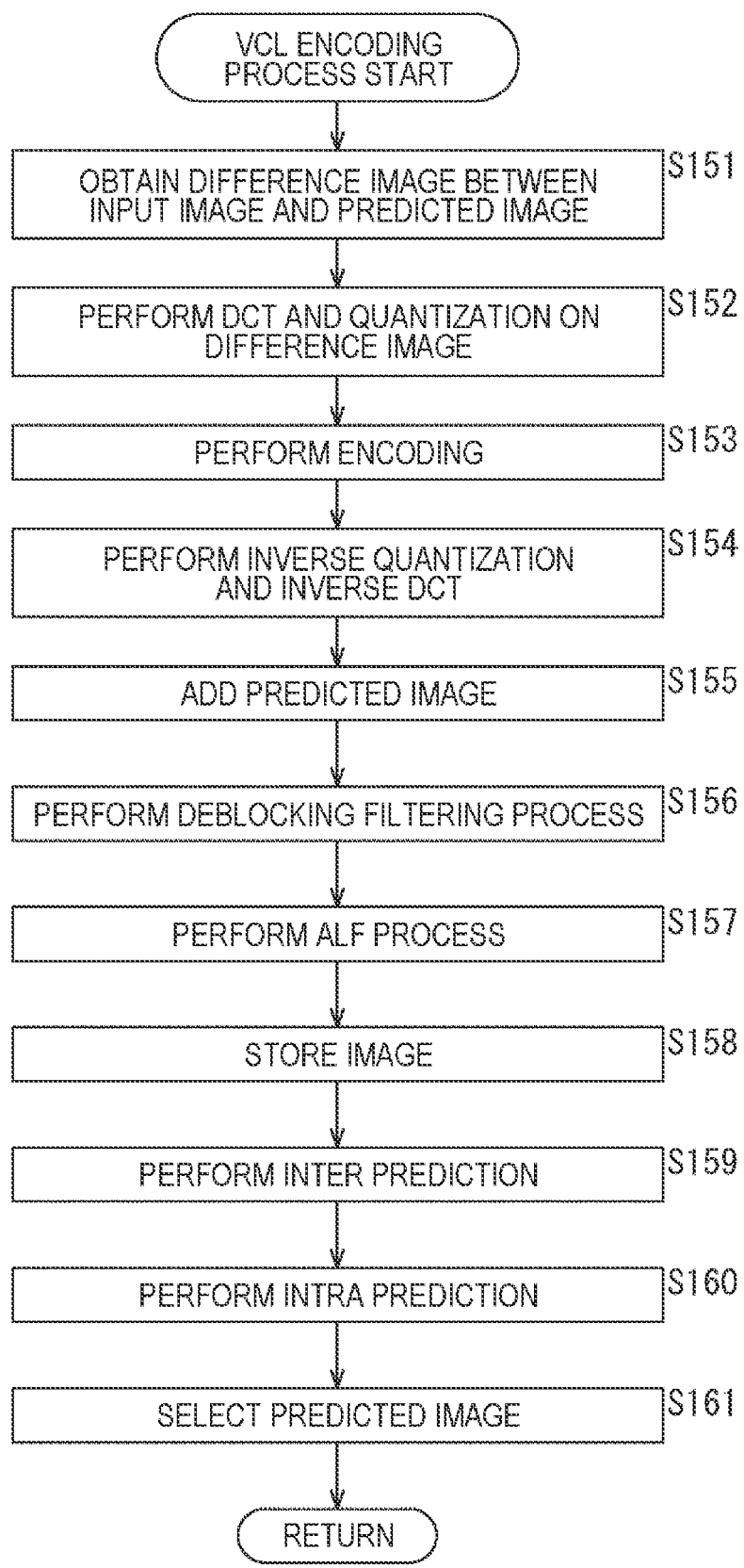
FIG. 12 is a flowchart for explaining the VCL encoding process in step S109 in FIG. 11.

FIG. 12 is a flowchart for explaining the VCL encoding process in step S110 in FIG. 11.

An input image input from the encoding order rearrangement unit 24 of the previous stage is supplied to the arithmetic unit 151, the spatial prediction unit 161, and the motion detection unit 159.

In step S151, the arithmetic unit 151 obtains a difference image between the input image and a predicted image supplied from the selector 162. The arithmetic unit 151 outputs the obtained difference image to the DCT/quantization unit 152.

In step S152, the DCT/quantization unit 152 performs DCT on the difference image supplied from the arithmetic unit 151. The DCT/quantization unit 152 quantizes the image subjected to the DCT, and outputs the quantized image to the entropy encoding unit 153 and the inverse quantization/inverse DCT unit 154.

In step S153, the entropy encoding unit 153 performs entropy encoding on the quantized image supplied from the DCT/quantization unit 152, and outputs a VCL that is an image obtained as a result of the encoding, to the arithmetic unit 28 in the stage that follows.

In step S154, the inverse quantization/inverse DCT unit 154 performs inverse quantization on the quantized image supplied from the DCT/quantization unit 152, to obtain the image subjected to the DCT. The inverse quantization/inverse DCT unit 154 performs inverse DCT on the image subjected to the DCT, to obtain the difference image. The difference image is supplied to the arithmetic unit 155.

In step S155, the arithmetic unit 155 adds the difference image supplied from the inverse quantization/inverse DCT unit 154 to the predicted image supplied from the selector 162. The arithmetic unit 155 outputs the image, which is the result of the addition, to the deblocking filter 156.

In step S156, the deblocking filter 156 performs a deblocking filtering process on the image supplied from the arithmetic unit 155, and outputs the image subjected to the deblocking filtering process, to the adaptive loop filter 157.

In step S157, the adaptive loop filter 157 performs an ALF process on the image subjected to the deblocking filtering process, and supplies the image subjected to the ALF process, to the frame memory 158.

In step S158, the frame memory 158 stores the image subjected to ALF process.

In step S159, the motion detection unit 159 and the motion compensation unit 160 perform inter prediction on the input image, to generate an inter predicted image. The inter predicted image is output to the selector 162.

In step S160, the spatial prediction unit 161 performs intra prediction on the input image, to generate an intra predicted image. The intra predicted image is output to the selector 162.

In step S161, the selector 162 selects the predicted image having a predetermined cost function indicating an optimum value, between the inter predicted image and the intra predicted image. The selector 162 outputs the selected predicted image to the arithmetic unit 151 and the arithmetic unit 155.

<Information That Needs To Be Transformed into SEI>

FIG. 13 is a chart showing an example of the information that needs to be transformed into SEI in the header information about the next AU in the processing order among the higher headers of the AUs when the image compression technique is AVC.

The information that needs to be transformed into SEI among the higher headers of the AUs is not necessarily all the header information about the next AU in the processing order, but may be part of the header information in some cases. Note that the information that needs to be transformed into SEI among the higher headers of the AUs is information that the decoding side wants beforehand, or information that the encoding side can generate in advance.

In the case of AVC, the information that needs to be transformed into SEI among the higher headers of the AUs is at least information necessary for generating nal_unit_type, pic_parameter_set_id, frame_num, field_pic_flag, bottom_field_flag, and a POC, as shown in FIG. 13.

Here, nal_unit_type is information indicating whether or not it is instantaneous decoder refresh (IDR). The information necessary for generating a POC is pic_order_cnt_lsb, delta_pic_order_cnt_bottom, and delta_pic_order_cnt[2], for example.

As the data related to the GOP structure, the frame/field, and the POC generation pattern can be defined beforehand, the encoding device 101 can generate the data in advance.

FIG. 14 is a chart showing an example of the information that needs to be transformed into SEI in the header information about the next AU in the processing order among the higher headers of the AUs when the image compression technique is HEVC.

In the case of HEVC, the information that needs to be transformed into SEI among the higher headers of the AUs is at least nal_unit_type, slice_pic_order_cnt_lsb, short_term_ref_pic_set_sps_flag, short_term_ref_pic_set_idx, num_long_term_sps, and num_long_term_pics, as shown in FIG. 14.

As for short_term_ref_pic_set_sps_flag, st_ref_pic_set (num_short_term_ref_pic_sets) is also necessary information. Further, when the inter-layer reference picture set (RPS) of the SPS is overwritten, the parameters extracted from st_ref_pic_set (num_short_term_ref_pic_sets) are also necessary information.

As for num_long_term_pics, when LongTerm is valid and is added as Picture, lt_idx_sps[i], poc_lsb_lt[i], usd_by_curr_pic_lt_flag[i], deita_poc_msb_present_flag[i], and delta_poc_msb_cycle_lt[i] are the necessary information.

In the case of HEVC, the RPS set necessary for the SPS is normally added after the GOP structure is determined.

Accordingly, the information that needs to be transformed into SEI among the higher headers of the AUs is almost only required to be the information necessary in POC generation, and thus, the encoding device 101 can generate the information in advance.

FIG. 15 is a chart showing an example of the parameters necessary in RefPicList generation among the syntax parameters of header information when the image compression technique is AVC.

In FIG. 15, the syntax parameters, the levels indicating whether or not it is necessary in RefPicList generation, and the reasons for the necessity are shown in this order from the left.

nal_unit_type is a parameter necessary in RefPicList generation. The reason for the necessity is that there is the need to know whether or not it is IDR.

pic_parameter_set_id is a parameter necessary in the processing generation of RefPicList. The reason for the necessity is to identify the PPS and the SPS. bottom_field_pic_order_in_frame_present_flag is a parameter included in the PPS, and is necessary in determining the presence/absence of delta_pic_order_cnt_bottom of Slice-Header.

frame_num is a parameter necessary in RefPicList generation. The reason for the necessity is that frame_num is necessary in RefPicList generation.

field_pic_flag and bottom_field_flag are parameters necessary in RefPicList generation. The reason for the necessity is that it is necessary in the RefPicList generation at the time of Field Coding. Note that field_pic_flag and bottom_field_flag are parameters necessary in RefPicList generation as long as they are present in the syntax. However, if not present in the syntax, they are parameters unnecessary in RefPicList generation.

pic_order_cnt_lsb is a parameter necessary in RefPicList generation. The reason for the necessity is that a POC is necessary in RefPicList generation when PocType=0.

delta_pic_order_cnt_bottom is a parameter necessary in RefPicList generation. The reason for the necessity is that a POC is necessary in RefPicList generation when PocType=0.

delta_pic_order_cnt[0] and delta_pic_order_cnt[1] are parameters necessary in RefPicList generation. The reason for the necessity is that a POC is necessary in RefPicList generation when PocType=1.

Note that the above parameters are the parameters necessary in RefPicList generation, but may be unnecessary depending on operational conditions in some cases.

For example, in the case of an operation with a fixed PPS, pps_id is unnecessary. In the case of an operation with Progressive only (frame_mbs_only_flag=1), field_pic_flag and bottom_field_flag are unnecessary. In the case of an operation with PocType=0, delta_pic_order_cnt[0] and delta_pic_order_cnt[1] are unnecessary. In the case of an operation with PocType=1, pic_order_cnt_lsb and delta_pic_order_cnt_bottom are unnecessary. In the case of an operation with PocType=2, delta_pic_order_cnt[0], delta_pic_order_cnt[1], pic_order_cnt_lsb, and delta_pic_order_cnt_bottom are unnecessary.

<<3. Decoding Device>>

<Example Configuration of a Decoding Device>

FIG. 16 is a block diagram showing an example configuration of a decoding device to which the present technology is applied. In the configuration shown in FIG. 16, the same components as those described with reference to FIG. 2 are denoted by the same reference numerals as those used in FIG. 2. The explanations that have already been made will not be repeated below.

A decoding device 201 in FIG. 16 includes a bitstream input unit 41, a header decoding unit 42, a next AU reference relationship decoding unit 211, a reference image information holding unit 212, a VCL decoding unit 44, and an image output unit 45.

The decoding device 201 differs from the decoding device 31 in FIG. 2 in that the reference relationship decoding unit 43 is replaced with the next AU reference relationship decoding unit 211, and the reference image information holding unit 212 is added.

The header decoding unit 42 decodes and interprets picture header information in parsing the header. The header decoding unit 42 in FIG. 16 further decodes and extracts the header information about the next AU transformed into SEI. The header decoding unit 42 outputs the interpreted header information and the extracted header information about the next AU to the next AU reference relationship decoding unit 211.

The next AU reference relationship decoding unit 211 refers to the DPB update information that is supplied from a DPB update unit 51 and has been updated by the post-processing of the AU that is the decoding target (hereinafter referred to as the current AU.), to calculate the parameters necessary in the process of decoding the next AU. The next AU reference relationship decoding unit 211 generates RefPicList (reference image information) for the next AU as a result of the calculation of the parameters necessary in the process of decoding the next AU. The next AU reference relationship decoding unit 211 outputs the RefPicList for the next AU to the reference image information holding unit 212.

The reference image information holding unit 212 already holds the RefPicList for the current AU, which has been generated by the preprocessing of the previous AU. The reference image information holding unit 212 then holds the RefPicList for the next AU supplied from the next AU reference relationship decoding unit 211.

The VCL decoding unit 44 refers to the RefPicList for the current AU, which has been processed at the time of decoding the AU immediately before the current AU and is held in the reference image information holding unit 212, and decodes an image and generates (reconstructs) a decoded image, without waiting for the preprocessing of the current AU. The VCL decoding unit 44 outputs the generated decoded image to the image output unit 45.

The DPB update unit 51 updates the DPB in post-processing, and outputs DPB update information to the next AU reference relationship decoding unit 211.

<Example Configuration of the VCL Decoding Unit>

Figure 17:
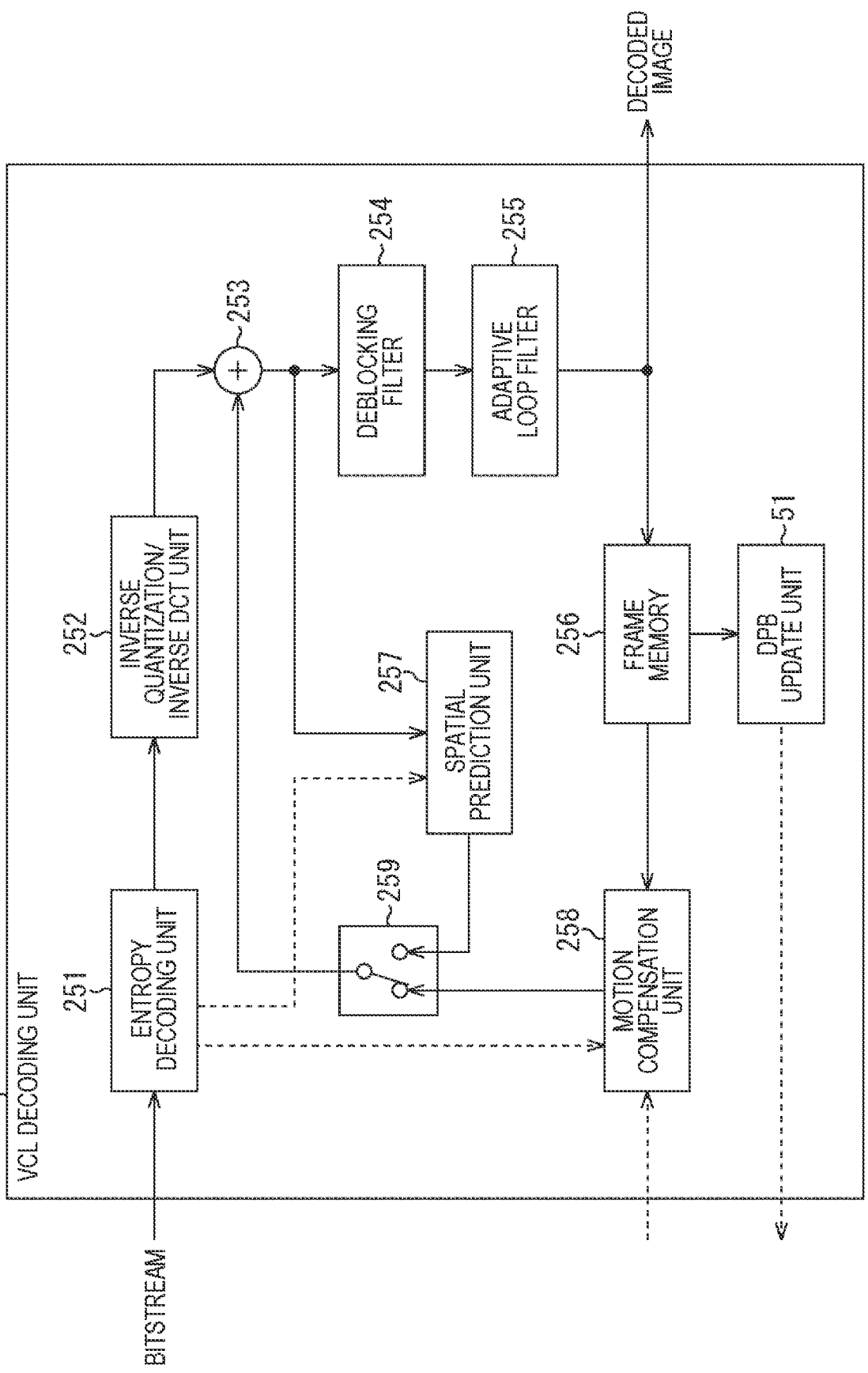
FIG. 17 is a block diagram showing an example configuration of a VCL decoding unit.

FIG. 17 is a block diagram showing an example configuration of the VCL decoding unit 44.

The VCL decoding unit 44 includes an entropy decoding unit 251, an inverse quantization/inverse DCT unit 252, an arithmetic unit 253, a deblocking filter 254, an adaptive loop filter 255, and a frame memory 256. The VCL decoding unit 44 also includes a spatial prediction unit 257, a motion compensation unit 258, a selector 259, and the DPB update unit 51.

The entropy decoding unit 251 decodes a bitstream supplied from the bitstream input unit 41, and outputs a difference image that is the result of the decoding to the inverse quantization/inverse DCT unit 252. The image that is the result of the decoding is obtained by the encoding device 101 performing quantization and DCT on the difference image from a predicted image.

The inverse quantization/inverse DCT unit 252 performs inverse quantization on the difference image that is the result of the decoding and is supplied from the entropy decoding unit 251. The inverse quantization/inverse DCT unit 252 performs inverse DCT on the result of the inverse quantization, to obtain the difference image subjected to the inverse DCT. The inverse quantization/inverse DCT unit 252 outputs the difference image to the arithmetic unit 253.

The arithmetic unit 253 adds a predicted image supplied from the selector 259 to the difference image, to generate a decoded image. The arithmetic unit 253 outputs the generated decoded image to the deblocking filter 254 and the spatial prediction unit 257.

The deblocking filter 254 performs a deblocking filtering process on the decoded image supplied from the arithmetic unit 253, and outputs the decoded image subjected to the deblocking filtering process, to the adaptive loop filter 255.

The adaptive loop filter 255 performs an ALF process on the decoded image subjected to the deblocking filtering process. The adaptive loop filter 255 outputs the decoded image subjected to the ALF process, to the image output unit 45 and the frame memory 256.

The frame memory 256 stores the decoded image supplied from the adaptive loop filter 255.

When the image included in the bitstream is an intra predicted image, the bitstream includes information indicating intra prediction. The information indicating the intra prediction is supplied from the entropy decoding unit 251 to the spatial prediction unit 257.

When the image included in the bitstream is an intra predicted image, the spatial prediction unit 257 performs intra prediction using the decoded image supplied from the arithmetic unit 253, and generates a predicted image. The spatial prediction unit 257 outputs the generated intra predicted image to the selector 259.

When the picture included in the bitstream is an inter predicted image, the bitstream includes information indicating inter prediction, and motion information indicating the motion vector used by the encoding device 101 to generate the inter predicted image. The information indicating inter prediction and the motion information are supplied from the entropy decoding unit 251 to the motion compensation unit 258.

When the image included in the bitstream is an inter predicted image, the motion compensation unit 258 performs motion compensation using the motion information supplied from the entropy decoding unit 251, and generates an inter predicted image. In the motion compensation at this stage, the RefPicList of the current AU held in the reference image information holding unit 212 is referred to, and the decoded image stored in the frame memory 256 is used. The motion compensation unit 258 outputs the generated inter predicted image to the selector 259.

The selector 259 outputs the supplied predicted image between the intra predicted image generated by the spatial prediction unit 257 and the inter predicted image generated by the motion compensation unit 258, to the arithmetic unit 253.

The DPB update unit 51 refers to the frame memory 256, performs a RefPicmarking process and a DPB update process as the post-processing of the current AU, and outputs DPB update information to the next AU reference relationship decoding unit 211.

<Operation of the Decoding Device>

Figure 18:
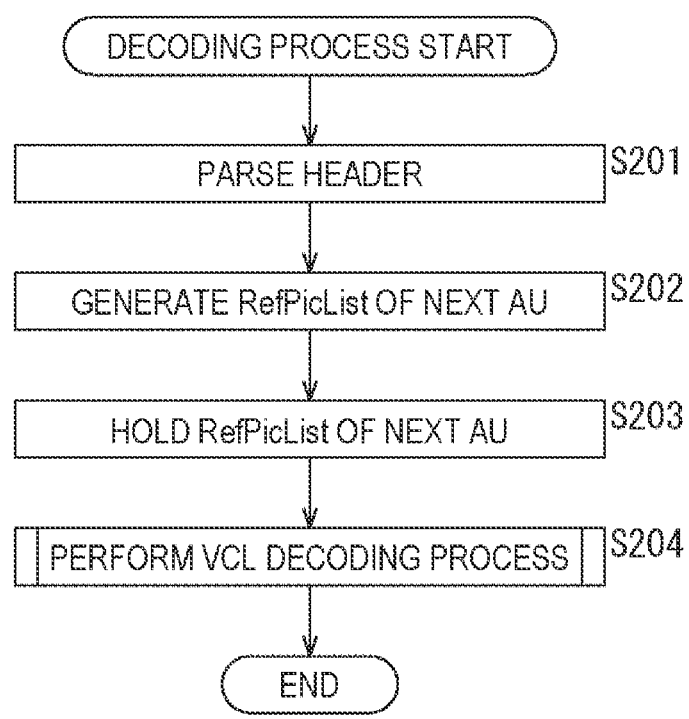
FIG. 18 is a flowchart for explaining a decoding process to be performed by the decoding device shown in FIG. 16.

FIG. 18 is a flowchart for explaining a decoding process to be performed by the decoding device shown in FIG. 16.

In step S201, the header decoding unit 42 decodes and interprets picture header information in parsing the header. The header decoding unit 42 also decodes and extracts the header information about the next AU transformed into SEI. The header decoding unit 42 outputs the interpreted header information and the extracted header information about the next AU to the next AU reference relationship decoding unit 211.

In step S202, the next AU reference relationship decoding unit 211 refers to the DPB update information that is supplied from the DPB update unit 51 and has been updated by the post-processing of the current AU, and calculates the parameters necessary in the decoding process for the next AU, to generate the RefPicList for the next AU.

In step S203, the reference image information holding unit 212 holds the RefPicList for the next AU supplied from the next AU reference relationship decoding unit 211.

In step S204, the VCL decoding unit 44 performs a VCL decoding process, by referring to the RefPicList for the current AU held in the reference image information holding unit 212. This VCL decoding process will be described later in detail, with reference to the next FIG. 19. At this point of time, the preprocessing of the current AU has ended during the decoding process for the previous AU. The VCL decoding unit 44 decodes the image, and generates (reconstructs) a decoded image. The VCL decoding unit 44 outputs the generated decoded image to the image output unit 45.

Note that steps S202 and S204 described above are processes that are performed in parallel as described later with reference to FIG. 20.

Figure 19:
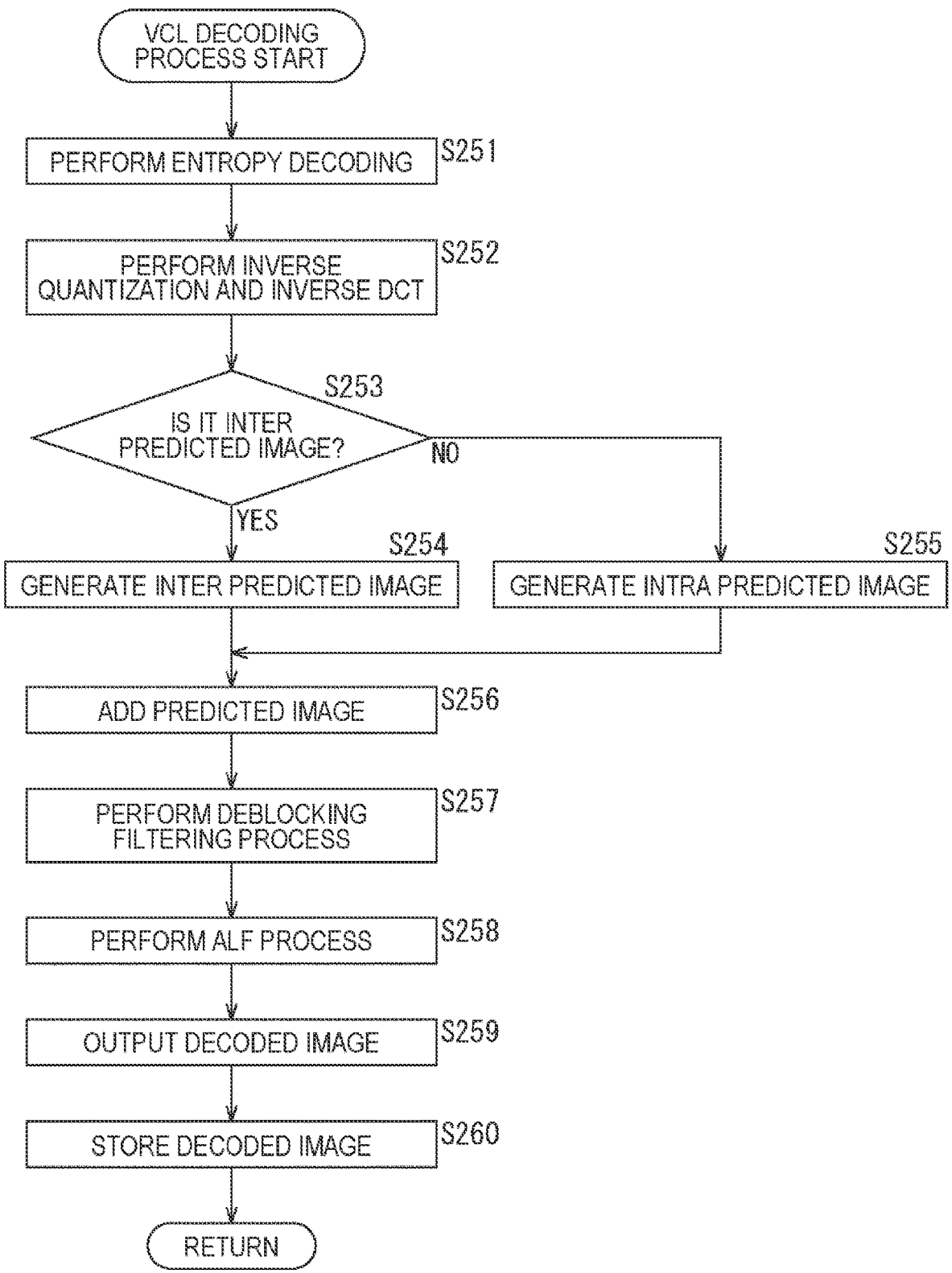
FIG. 19 is a flowchart for explaining the VCL decoding process in step S204 in FIG. 18.

FIG. 19 is a flowchart for explaining the VCL decoding process in step S204 in FIG. 18.

In step S251, the entropy decoding unit 251 performs entropy decoding on a bitstream supplied from the bitstream input unit 41, and outputs a difference image that is the result of the decoding to the inverse quantization/inverse DCT unit 252.

In step S252, the inverse quantization/inverse DCT unit 252 performs inverse quantization on the difference image that is the result of the decoding and is supplied from the entropy decoding unit 251. The inverse quantization/inverse DCT unit 252 performs inverse DCT on the result of the inverse quantization, to obtain the difference image subjected to the inverse DCT. The inverse quantization/inverse DCT unit 252 outputs the difference image to the arithmetic unit 253.

In step S253, the spatial prediction unit 257 and the motion compensation unit 258 determine whether or not the image of the current AU included in the bitstream is an inter predicted image. If the image of the current AU is determined to be an inter predicted image in step S253, the process moves on to step S254.

In step S254, the motion compensation unit 258 performs motion compensation using the motion information included in the bitstream, and generates an inter predicted image. In the motion compensation at this stage, the RefPicList of the current AU held in the reference image information holding unit 212 is referred to, and the decoded image stored in the frame memory 256 is used. The motion compensation unit 258 outputs the generated inter predicted image to the selector 259.

If the image of the current AU is determined to be an intra predicted image in step S253, the process moves on to step S255.

In step S255, the spatial prediction unit 257 performs intra prediction using the decoded image supplied from the arithmetic unit 253, and generates a predicted image. The spatial prediction unit 257 outputs the generated intra predicted image to the selector 259.

The selector 259 outputs the predicted image supplied in step S254 or S255 to the arithmetic unit 253, and the process moves on to step S256.

In step S256, the arithmetic unit 253 adds the predicted image supplied from the selector 259 to the difference image supplied from the inverse quantization/inverse DCT unit 252, to generate a decoded image. The arithmetic unit 253 outputs the generated decoded image to the deblocking filter 254 and the spatial prediction unit 257.

In step S257, the deblocking filter 254 performs a deblocking filtering process on the decoded image supplied from the arithmetic unit 253. The deblocking filter 254 outputs the decoded image subjected to the deblocking filtering process, to the adaptive loop filter 255.

In step S258, the adaptive loop filter 255 performs an ALF process on the decoded image subjected to the deblocking filtering process. The adaptive loop filter 255 outputs the decoded image subjected to the ALF process, to the frame memory 256 and the image output unit 45.

In step S259, the adaptive loop filter 255 outputs the decoded image subjected to the ALF process, to the image output unit 45 and the frame memory 256.

In step S260, the frame memory 256 stores the decoded image supplied from the adaptive loop filter 255. After step S260, the VCL decoding process comes to an end.

<Sequences in the Respective Processes in the Decoding Device of the Present Technology>>

Figure 20:
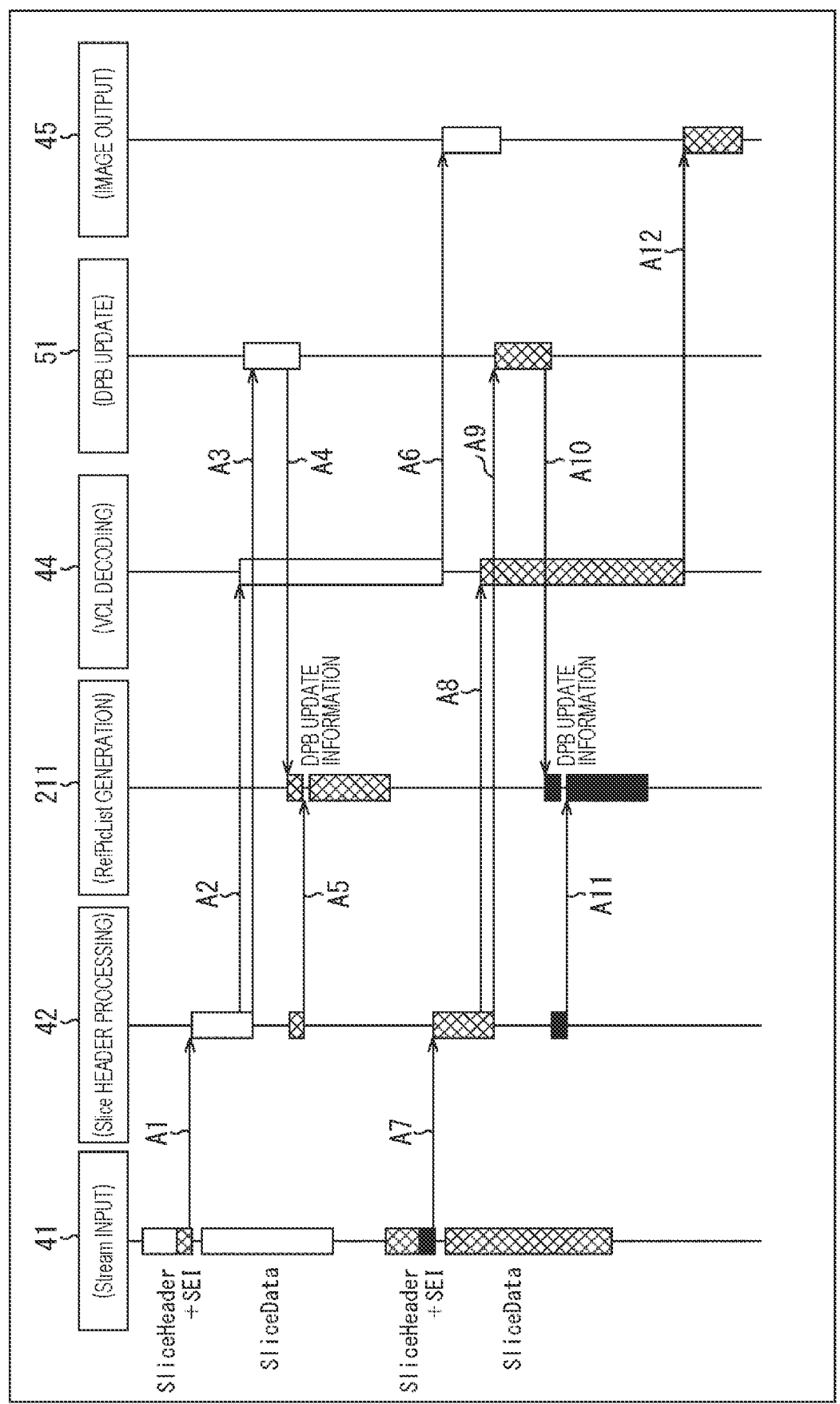
FIG. 20 is a chart showing the timings of the respective processes in the decoding device of the present technology.

FIG. 20 is a chart showing the sequences in the respective processes in the decoding device of the present technology.

In FIG. 20, the respective sequences in a stream input to be performed by the bitstream input unit 41, Slice header processing to be performed by the header decoding unit 42, RefPicList generation to be performed by the next AU reference relationship decoding unit 211, VCL decoding to be performed by the VCL decoding unit 44, DPB update to be performed by the DPB update unit 51, and an image output to be performed by the image output unit 45 are shown in this order from the left side.

Also, in each sequence, a white rectangle indicates a process related to the current AU-1. A hatched rectangle indicates a process related to AU-2, which is the AU immediately after the current AU-1. A black rectangle indicates a process related to AU-3, which is the AU immediately after AU-2.

First, after the bitstream input unit 41 inputs the Slice-Header of AU-1 and the SEI about AU-2, but before the bitstream input unit 41 inputs the SliceData of AU-1, the header decoding unit 42 starts Slice header processing on AU-1, as indicated by an arrow A1.

In the latter half of the Slice header processing on AU-1, the VCL decoding unit 44 starts VCL decoding on AU-1, as indicated by an arrow A2.

Further, after the Slice header processing by the header decoding unit 42, DPB update of AU-1 by the DPB update unit 51 is started, as indicated by an arrow A3.

In the latter half of the DPB update of AU-1, the DPB update information generated for AU-2 by the DPB update unit 51 is supplied to the next AU reference relationship decoding unit 211, as indicated by an arrow A4.

After the header decoding unit 42 finishes decoding the SEI about AU-2 started after the end of the Slice header processing on AU-1, the next AU reference relationship decoding unit 211 starts RefPicList generation, as indicated by an arrow A5.

Further, after the VCL decoding on AU-1 by the VCL decoding unit 44 is completed, the output of the decoded image of AU-1 by the image output unit 45 is started, as indicated by an arrow A6.

Meanwhile, after completing the input of the SliceData of AU-1, the bitstream input unit 41 starts inputting the SliceHeader of AU-2 and the SEI about AU-3. After the bitstream input unit 41 inputs the SliceHeader of AU-2 and the SEI about AU-3, but before the bitstream input unit 41 inputs the SliceData of AU-2, the header decoding unit 42 starts Slice header processing on AU-2, as indicated by an arrow A7.

In the latter half of the Slice header processing on AU-2, the VCL decoding unit 44 starts VCL decoding on AU-2, as indicated by an arrow A8.

Further, after the Slice header processing by the header decoding unit 42, DPB update of AU-2 by the DPB update unit 51 is started, as indicated by an arrow A9.

In the latter half of the DPB update of AU-2, the DPB update information generated for AU-3 by the DPB update unit 51 is supplied to the next AU reference relationship decoding unit 211, as indicated by an arrow A10.

After the header decoding unit 42 finishes decoding the SEI about AU-3 started after the end of the Slice header processing on AU-2, the next AU reference relationship decoding unit 211 starts RefPicList generation, as indicated by an arrow A11.

Further, after the VCL decoding on AU-2 by the VCL decoding unit 44 is completed, the output of the decoded image of AU-2 by the image output unit 45 is started, as indicated by an arrow A12.

As described above, the decoding device 201 can perform each of the above processes in parallel, without waiting for completion of the sequence for one AU. Particularly, as the RefPicList generation is completed at the time of processing of the previous AU, the decoding device 201 can perform VCL decoding without waiting for the RefPicList generation. Thus, a decoding process from inputting to outputting can be efficiently performed.

<Sequences in the Respective Processes in a Conventional Decoding Device>

Figure 21:
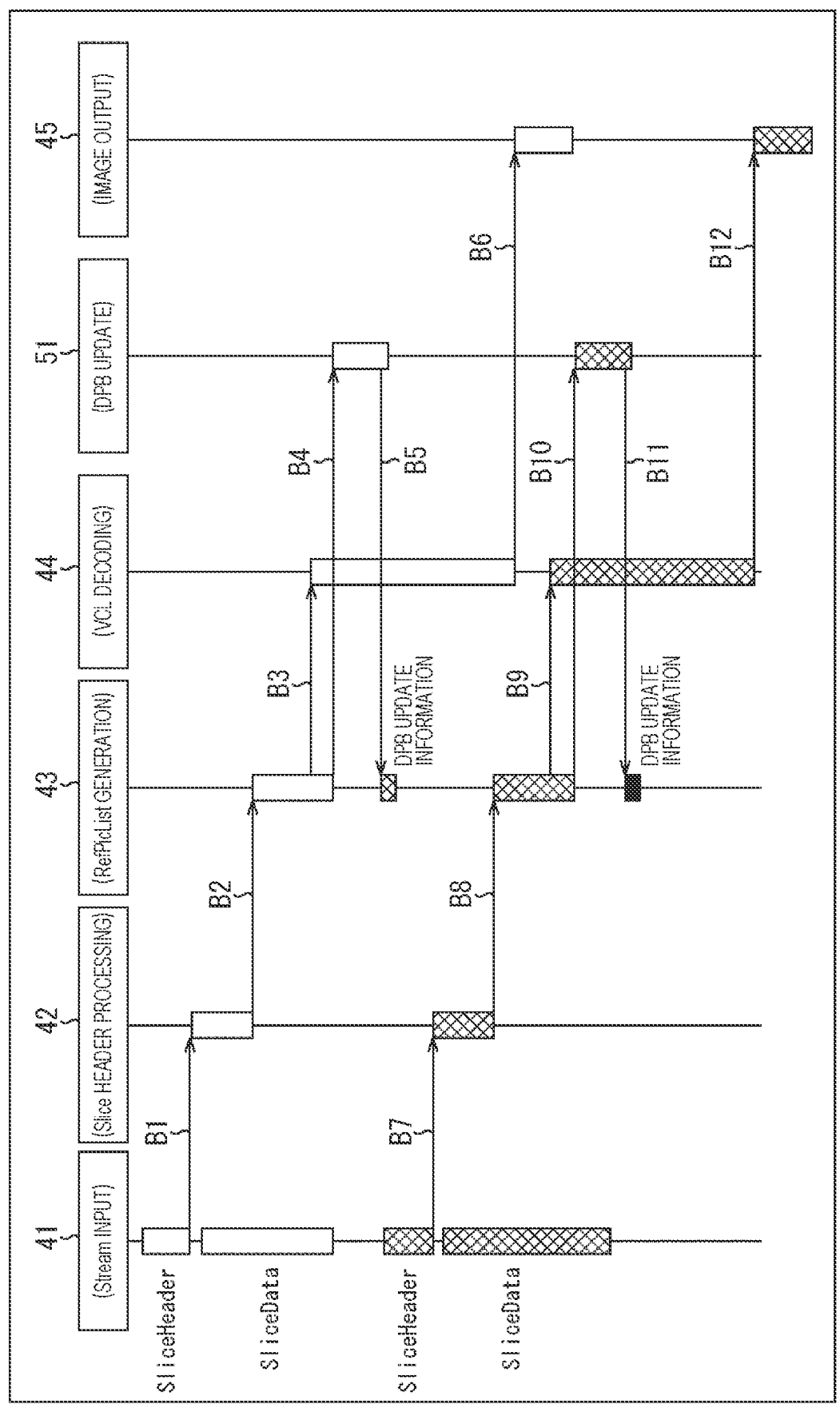
FIG. 21 is a chart showing the timings of the respective processes in a conventional decoding device.

FIG. 21 is a chart showing the sequences in the respective processes in a conventional decoding device, for comparison with the chart shown in FIG. 20.

In FIG. 21, the respective sequences in a stream input to be performed by the bitstream input unit 41, Slice header processing to be performed by the header decoding unit 42, RefPicList generation to be performed by the reference relationship decoding unit 43, VCL decoding to be performed by the VCL decoding unit 44, DPB update to be performed by the DPB update unit 51, and an image output to be performed by the image output unit 45 are shown in this order from the left side.

Also, in each sequence, a white rectangle indicates a process related to the current AU-1. A hatched rectangle indicates a process related to AU-2, which is the AU immediately after the current AU-1. A black rectangle indicates a process related to AU-3, which is the AU immediately after AU-2.

First, after the bitstream input unit 41 inputs the SliceHeader of AU-1, but before the bitstream input unit 41 inputs the SliceData of AU-1, the header decoding unit 42 starts Slice header processing on AU-1, as indicated by an arrow B1.

Further, after the Slice header processing by the header decoding unit 42, the reference relationship decoding unit 43 starts generating the RefPicList for AU-1, as indicated by an arrow B2.

In the latter half of the RefPicList generation for AU-1, the VCL decoding unit 44 starts VCL decoding on AU-1, as indicated by an arrow B3.

After the generation of the RefPicList for AU-1 by the reference relationship decoding unit 43, DPB update of AU-1 by the DPB update unit 51 is started, as indicated by an arrow B4.

After the end of the DPB update of AU-1, the DPB update information generated for AU-2 by the DPB update unit 51 is supplied to the reference relationship decoding unit 43, as indicated by an arrow B5.

Further, after the VCL decoding on AU-1 by the VCL decoding unit 44 is completed, the output of the decoded image of AU-1 by the image output unit 45 is started, as indicated by an arrow B6.

Meanwhile, after completing the input of the SliceData of AU-1, the bitstream input unit 41 starts inputting the SliceHeader of AU-2. After the bitstream input unit 41 inputs the SliceHeader of AU-2, but before the bitstream input unit 41 inputs the SliceData of AU-2, the header decoding unit 42 starts Slice header processing on AU-2, as indicated by an arrow B7.

After the Slice header processing by the header decoding unit 42, the reference relationship decoding unit 43 starts generating the RefPicList for AU-2, as indicated by an arrow B8.

In the latter half of the RefPicList generation for AU-2, the VCL decoding unit 44 starts VCL decoding on AU-2, as indicated by an arrow B9.

After the generation of the RefPicList for AU-2 by the reference relationship decoding unit 43, DPB update of AU-2 by the DPB update unit 51 is started, as indicated by an arrow B10.

After the end of the DPB update of AU-2, the DPB update information generated for AU-3 by the DPB update unit 51 is supplied to the reference relationship decoding unit 43, as indicated by an arrow B11.

Further, after the VCL decoding on AU-2 by the VCL decoding unit 44 is completed, the output of the decoded image of AU-2 by the image output unit 45 is started, as indicated by an arrow B12.

As described above, the decoding device 31 cannot start the next process unless one process for one AU is completed. Therefore, a delay sometimes occurs between the respective processes in the decoding device 31.

In the present technology, on the other hand, the header information about the next AU in the AU processing order or information regarding the header information is added to the SEI about an AU, so that an encoded stream is generated. As a result, the decoding device 201 can perform each process related to decoding in parallel, without waiting for completion of a sequence for one AU. Thus, a decoding process from inputting to outputting can be efficiently performed.

<Timings of the Respective Processes in the Decoding Device of the Present Technology>

Figure 22:
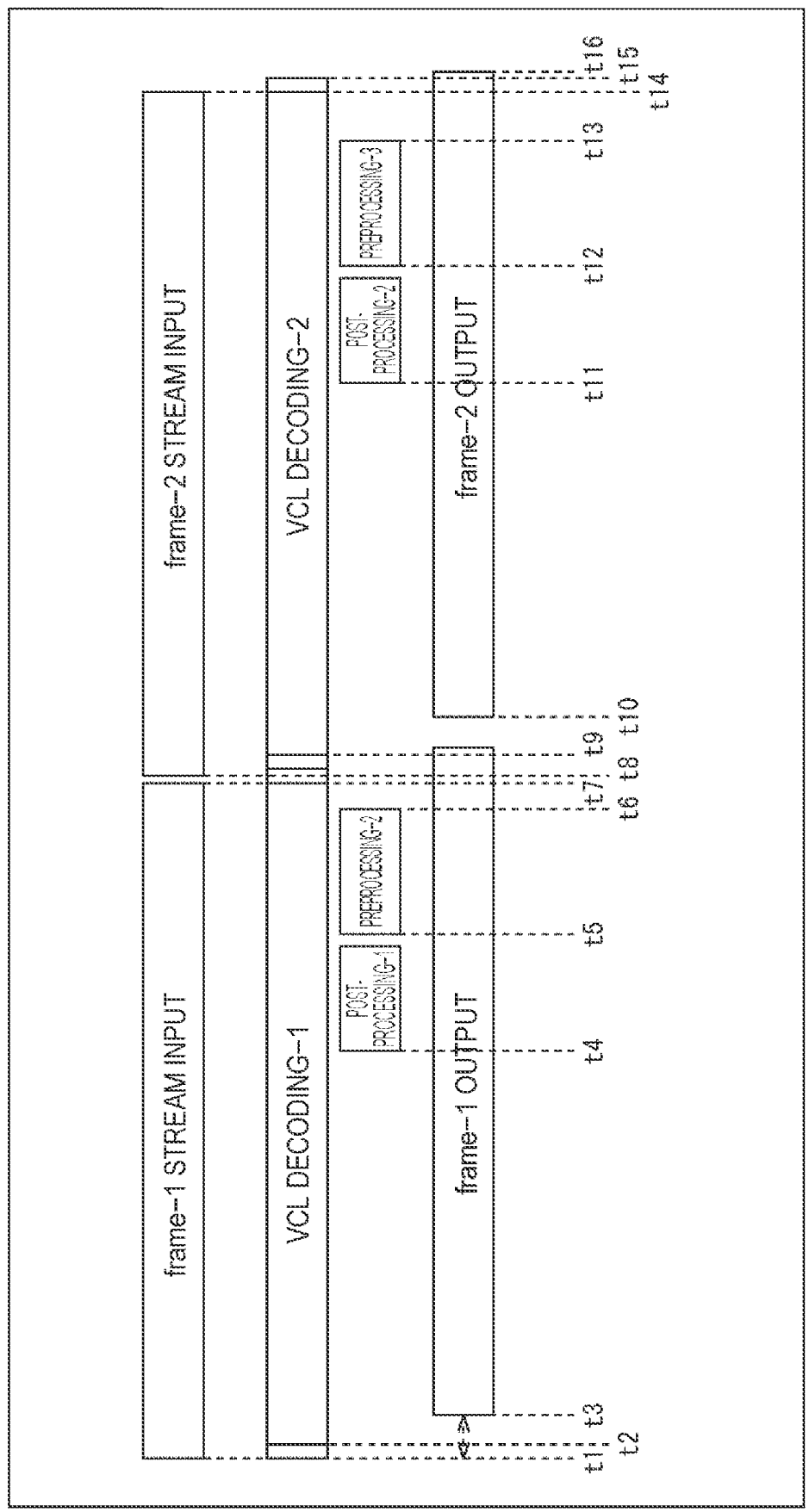
FIG. 22 is a chart showing the timings of the respective processes in the decoding device of the present technology.

FIG. 22 is a chart showing the timings of the respective processes in the decoding device of the present technology.

At time t1, the input of the frame-1 stream is started. Because VCL decoding-1 of frame-1 is started at time t2, the output of frame-1 is started at time t3 immediately after time t2.

At time t4 at which VCL decoding-1 of frame-1 is being performed, post-processing-1 of frame-1 is started. Preprocessing-2 of frame-2 is started at time t5 after the end of post-processing-1, and preprocessing-2 ends at time t6 before the end of the input of the frame-1 stream.

At time t7, the input of the frame-1 stream ends, and VCL decoding-1 of frame-1 ends.

After the input of the frame-1 stream, the input of the frame-2 stream is started at time t8. Since preprocessing-2 has ended at time t6, VCL decoding-2 of frame-2 is started at time t9 immediately after the input of the frame-2 stream. Further, the output of frame-2 is started at time t10 immediately after that.

At time t11 at which VCL decoding-2 of frame-2 is being performed, post-processing-2 of frame-2 is started. At time t12 after the end of post-processing-2, preprocessing-3 of frame-3 is started. After that, preprocessing-3 ends at time t13 before the input of the frame-2 stream ends.

The input of the frame-2 stream ends at time t14, and VCL decoding-2 of frame-2 ends at time t15. The output of the frame-2 stream then ends at time t16.

As described above, in the case of the decoding device 201, it is not necessary to perform the preprocessing of the current frame, which is the generation of the RefPicList for the current frame, at the time of decoding of the current frame as in the example described above with reference to FIG. 3. Accordingly, VCL decoding-1 of frame-1 is started at time t2, and thus, frame-1 is output at time t3 immediately after that.

As a result, the delay from the input of a stream till the generation of a decoded image can be shortened.

<<3. Other Aspects>>

<Effects>

In the present technology, the header information about the next AU in the processing order is added to the SEI about each AU, to generate an encoded stream.

According to the present technology, VCL decoding (decoded image generation) can be started at earlier timing than in conventional cases. That is, the delay from the input of a stream till the generation of a decoded image can be shortened.

Also, according to the present technology, the performance of the VCL decoding unit can be lowered (the operating frequency can be lowered, and the circuit scale can be reduced).

Accordingly, unlike a conventional real-time decoder, the VCL decoding unit does not need to be designed to achieve real-time performance by combining the overhead of preprocessing and a decoding process.

Note that a stream to be generated by the present technology is obtained within a range compliant with an existing Codec standard. Accordingly, a decoding device according to the present technology can achieve effects, but a decoding device not according to the present technology is not affected at all.

<Example Configuration of a Computer>

The series of processes described above can be performed by hardware, and can also be performed by software. When the series of processes are performed by software, the program that forms the software may be installed in a computer incorporated into special-purpose hardware, or may be installed from a program recording medium into a general-purpose personal computer or the like.

Figure 23:
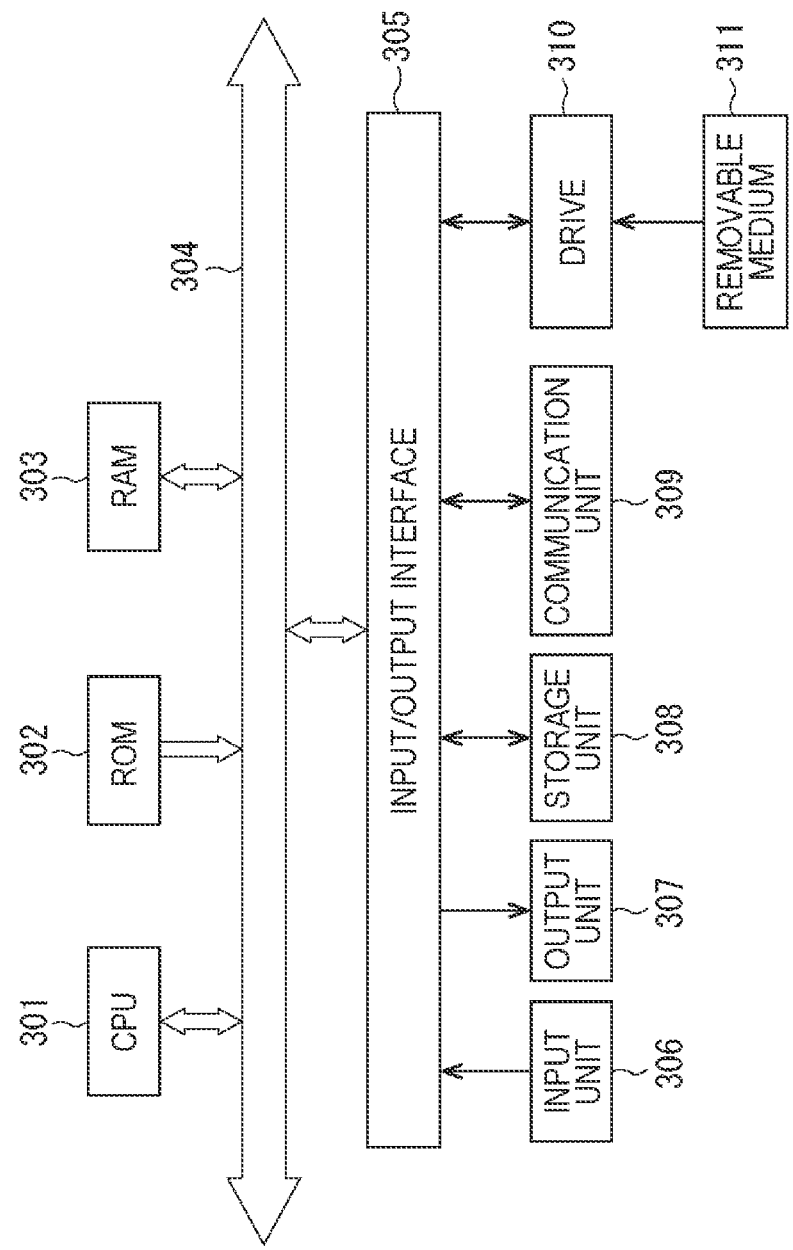
FIG. 23 is a block diagram showing an example configuration of a computer.

FIG. 23 is a block diagram showing an example configuration of the hardware of a computer that performs the above series of processes according to a program.

A central processing unit (CPU) 301, a read only memory (ROM) 302, and a random access memory (RAM) 303 are connected to one another by a bus 304.

An input/output interface 305 is further connected to the bus 304. An input unit 306 formed with a keyboard, a mouse, and the like, and an output unit 307 formed with a display, a speaker, and the like are connected to the input/output interface 305. Further, a storage unit 308 formed with a hard disk, a nonvolatile memory, or the like, a communication unit 309 formed with a network interface or the like, and a drive 310 that drives a removable medium 311 are connected to the input/output interface 305.

In the computer having the above described configuration, the CPU 301 loads a program stored in the storage unit 308 into the RAM 303 via the input/output interface 305 and the bus 304, for example, and executes the program, so that the above described series of processes are performed.

The program to be executed by the CPU 301 is recorded in the removable medium 311 and is thus provided, for example, or is provided via a wired or wireless transmission medium, such as a local area network, the Internet, or digital broadcasting. The program is then installed into the storage unit 308.

Note that the program to be executed by the computer may be a program for performing processes in chronological order in accordance with the sequence described in this specification, or may be a program for performing processes in parallel or performing a process when necessary, such as when there is a call.

It should be noted that, in this specification, a system means an assembly of a plurality of components (devices, modules (parts), and the like), and not all the components need to be provided in the same housing. In view of this, a plurality of devices that are housed in different housings and are connected to one another via a network forms a system, and one device having a plurality of modules housed in one housing is also a system.

Further, the advantageous effects described in this specification are merely examples, and the advantageous effects of the present technology are not limited to them or may include other effects.

Embodiments of the present technology are not limited to the embodiments described above, and various modifications may be made to them without departing from the scope of the present technology.

For example, the present technology can be embodied in a cloud computing configuration in which one function is shared among a plurality of devices via a network, and processing is performed by the devices cooperating with one another.

Further, the respective steps described with reference to the flowcharts described above may be carried out by one device or may be shared among a plurality of devices.

Furthermore, when a plurality of processes is included in one step, the plurality of processes included in the one step may be performed by one device or may be shared among a plurality of devices.

<Example Combinations of Configurations>

The present technology may also be embodied in the configurations described below.

(1)

An image processing apparatus including an encoded stream generation unit that generates an encoded stream by adding at least part of header information about a second access unit (AU) to be processed immediately after a first AU or information regarding at least part of the header information, to supplemental enhancement information (SEI) about the first AU.

(2)
The image processing apparatus according to (1), in which
the first AU is a top AU in a group of pictures (GOP), and
the encoded stream generation unit adds at least part of the header information about an AU after the second AU in the GOP to the SEI about the first AU.

(3)
The image processing apparatus according to (1), in which
the first AU is a top AU in a GOP, and
the encoded stream generation unit adds a generation pattern for generating at least part of the header information about an AU in the GOP to the SEI about the first AU.

(4)
The image processing apparatus according to (1), in which
the encoded stream generation unit adds at least part of the header information about the second AU to the SEI about the first AU.

(5)
The image processing apparatus according to any one of (1) to (4), in which
at least part of the header information is information necessary in preprocessing for a decoding process.

(6)
The image processing apparatus according to (5), in which
the information necessary in the preprocessing is information necessary in POC generation.

(7)
The image processing apparatus according to (5), in which
the information necessary in the preprocessing is a parameter that varies with each picture.

(8)
The image processing apparatus according to any one of (5) to (7), in which
the preprocessing includes a parsing process for the header information, a POC generation process, and a RefPicList generation process.

(9)
An image processing method implemented by an image processing apparatus,
the image processing method including
generating an encoded stream by adding at least part of header information about a second access unit (AU) to be processed immediately after a first AU or information regarding at least part of the header information, to supplemental enhancement information (SEI) about the first AU.

(10)
An image processing apparatus including
a decoding unit that decodes a second AU on the basis of header information that is processed upon receipt of an encoded stream, the encoded stream having been generated by adding at least part of the header information about the second AU to be processed immediately after a first AU or information regarding at least part of the header information, to SEI about the first AU.

(11)
An image processing method implemented by an image processing apparatus, the image processing method including
decoding a second AU on the basis of header information that is processed upon receipt of an encoded stream, the encoded stream having been generated by adding at least part of the header information about the second AU to be processed immediately after a first AU or information regarding at least part of the header information, to SEI about the first AU.

REFERENCE SIGNS LIST

21 Image capture unit
22 Picture type determination unit
23 GOP structure generation unit
24 Encoding rearrangement unit
25 Higher header generation unit
26 Higher header encoding unit
27 VCL encoding unit
28 Arithmetic unit
41 Bitstream input unit
42 Header decoding unit
44 VCL decoding unit
45 Image output unit
51 DPB update unit
101 Encoding device
111 Higher header holding memory
112 Higher header SEI unit
113 SEI encoding unit
114 Arithmetic unit
201 Decoding device
211 Next AU reference relationship decoding unit
212 Reference image information holding unit

The invention claimed is:

1. An image processing apparatus, comprising:
at least one processor configured to:
extract one of a first part of header information of a second access unit (AU) or information regarding a second part of the header information of the second AU;
add, to supplemental enhancement information (SEI) of a first AU, the one of:
the first part of the header information of the second AU, wherein the second AU is processed subsequent to the first AU, or
the information regarding the second part of the header information of the second AU;
add, to the SEI of the first AU, a generation pattern for generation of a part of header information of a third AU, wherein the third AU is processed subsequent to the second AU; and
generate an encoded stream based on
the addition of the generation pattern, and
the addition of the one of the first part of the header information of the second AU or the information regarding the second part of the header information of the second AU.

2. The image processing apparatus according to claim 1, wherein
the first AU is a top AU in a group of pictures (GOP),
the at least one processor is further configured to add the part of the header information of the third AU to the SEI of the first AU, and
the third AU is subsequent to the second AU in the GOP.

3. The image processing apparatus according to claim 1, wherein the first AU is a top AU in a GOP.

4. The image processing apparatus according to claim 1, wherein the first part of the header information of the second AU includes information necessary in a preprocessing operation for a decoding process.

5. The image processing apparatus according to claim 4, wherein the information necessary in the preprocessing operation includes information necessary in picture order count (POC) generation.

6. The image processing apparatus according to claim 4, wherein the information necessary in the preprocessing operation includes a parameter that varies with each picture of a plurality of pictures.

7. The image processing apparatus according to claim 4, wherein the preprocessing operation includes a parsing process for the header information of the second AU, a POC generation process, and a RefPicList generation process.

8. An image processing method by an image processing apparatus, the image processing method comprising:
    extracting one of a first part of header information of a second access unit (AU) or information regarding a second part of the header information of the second AU;
    adding, to supplemental enhancement information (SEI) of a first AU, the one of:
        the first part of the header information of the second AU, wherein the second AU is processed subsequent to the first AU, or
        the information regarding the second part of the header information of the second AU;
    adding, to the SEI of the first AU, a generation pattern for generation of a part of header information of a third AU, wherein the third AU is processed subsequent to the second AU; and
    generating an encoded stream based on
        the addition of the generation pattern, and
        the addition of the one of the first part of the header information of the second AU or the information regarding the second part of the header information of the second AU.

9. An image processing apparatus, comprising:
    at least one processor configured to:
        receive an encoded stream that includes header information of a second access unit (AU);
        decode the second AU based on the header information of the second AU in the encoded stream, wherein the encoded stream is based on
            extraction of one of a first part of the header information of the second AU or information regarding a second part of the header information of the second AU,
            addition of the one of the first part of the header information of the second AU or the information regarding the second part of the header information of the second AU, to supplemental enhancement information (SEI) of a first AU, and
            addition of a generation pattern to the SEI of the first AU,
        the generation pattern is for generation of a part of header information of a third AU, and
        the third AU is processed subsequent to the second AU;
    execute a first process on the first AU; and
    execute a second process on the second AU subsequent to the execution of the first AU.

10. An image processing method by an image processing apparatus, the image processing method comprising:
    receiving an encoded stream that includes header information of a second access unit (AU);
    decoding the second AU based on the header information of the second AU in the encoded stream, wherein the encoded stream is based on
        extraction of one of a first part of the header information of the second AU or information regarding a second part of the header information of the second AU,
        addition of the one of the first part of the header information of the second AU or the information regarding the second part of the header information of the second AU, to supplemental enhancement information (SEI) of a first AU, and
        addition of a generation pattern to the SEI of the first AU,
    the generation pattern is for generation of a part of header information of a third AU,
    the third AU is processed subsequent to the second AU;
    executing a first process on the first AU; and
    executing a second process on the second AU subsequent to the execution of the first AU.

\* \* \* \* \*